United States Patent [19]

Lovrenich

[11] Patent Number: 5,157,595
[45] Date of Patent: * Oct. 20, 1992

[54] DISTRIBUTED LOGIC CONTROL SYSTEM AND METHOD

[75] Inventor: Rodger T. Lovrenich, Santa Teresa, N. Mex.

[73] Assignee: El Paso Technologies, Company, El Paso, Tex.

[*] Notice: The portion of the term of this patent subsequent to Aug. 15, 2006 has been disclaimed.

[21] Appl. No.: 667,249

[22] Filed: Mar. 8, 1991

Related U.S. Application Data

[63] Continuation of Ser. No. 463,868, Jan. 5, 1990, abandoned, which is a continuation of Ser. No. 340,435, Apr. 19, 1989, abandoned, which is a continuation of Ser. No. 38,018, Apr. 14, 1987, Pat. No. 4,858,102, which is a continuation-in-part of Ser. No. 757,279, Jul. 19, 1985, abandoned.

[51] Int. Cl.[5] .................. G06F 15/46; G05B 11/01
[52] U.S. Cl. ............................... 364/136; 364/141; 364/183; 364/474.11; 364/474.19
[58] Field of Search ............... 364/136, 140, 141, 147, 364/183, 184, 474.19, 474.2, 474.11, 900 MS File; 371/29.1, 47.1, 48

[56] References Cited

U.S. PATENT DOCUMENTS 3,611,312 10/1971 Barton et al. .
3,618,045 11/1971 Campbell et al. .
3,623,011 11/1971 Baynard et al. .
3,651,495 3/1972 Sauvan .

(List continued on next page.)

OTHER PUBLICATIONS

Mical and Schwarm, "Implementing State Diagrams in High Level Language," 1989, pgs. 89–96.
Ziemba, "Use of a Programmable Logic Controller (List continued on next page.)

*Primary Examiner*—Jerry Smith
*Assistant Examiner*—Jim Trammell
*Attorney, Agent, or Firm*—Donald J. Lisa

[57] ABSTRACT

A system and method for controlling operation of a plurality of elements in an automated process, such as a production process, and indicating error conditions as they occur. Each unique set of input and output conditions of the various system elements defines a unique logic state or zone. Thus, there are defined a multiplicity of valid system logic states or zones, each having a unique input/output image. A predetermined sequence of zones, productive zones representing designed machine operations, is stored in a zone table. All zones not explicitly defined in the zone table are automatically treated as error zones. A zone engine automatically cycles to observe any change in input/output image. Any change in inputs from the various system elements automatically transfer action to the unique zone associated with such inputs, resulting in corresponding changes in control outputs to the system elements and/or display an error message as appropriate.

40 Claims, 11 Drawing Sheets

U.S. PATENT DOCUMENTS

| | | |
|---|---|---|
| 3,655,404 | 5/1972 | Weiner . |
| 3,702,986 | 11/1972 | Taylor et al. . |
| 3,719,931 | 3/1973 | Schroeder . |
| 3,755,787 | 8/1973 | Henegar . |
| 3,761,882 | 9/1973 | Bartlett et al. . |
| 3,794,982 | 2/1974 | McCormick et al. . |
| 3,810,100 | 5/1974 | Hungerford et al. . |
| 3,810,118 | 5/1974 | Kiffmeyer . |
| 3,829,842 | 8/1974 | Langdon et al. . |
| 3,839,707 | 10/1974 | Woodward et al. . |
| 3,875,380 | 4/1975 | Rankin . |
| 3,974,484 | 8/1976 | Struger et al. ......... 364/900 |
| 4,015,548 | 4/1977 | Schuss . |
| 4,029,950 | 6/1977 | Haga . |
| 4,034,354 | 7/1977 | Simmons . |
| 4,038,533 | 7/1977 | Dummermuth et al. . |
| 4,064,395 | 12/1977 | Schubeler et al. . |
| 4,095,094 | 6/1978 | Struger et al. . |
| 4,123,795 | 10/1978 | Dean Jr. et al. . |
| 4,133,477 | 1/1979 | Marino et al. . |
| 4,138,718 | 2/1979 | Toke et al. . |
| 4,144,550 | 3/1979 | Donohue et al. . |
| 4,149,235 | 8/1979 | Froyd et al. . |
| 4,165,534 | 8/1979 | Dummermuth et al. . |
| 4,200,915 | 4/1980 | Struger et al. . |
| 4,200,936 | 4/1980 | Borzcik et al. . |
| 4,228,496 | 10/1980 | Katzman et al. . |
| 4,241,400 | 12/1980 | Kiefer . |
| 4,241,402 | 12/1980 | Bird et al. . |
| 4,215,395 | 7/1980 | Bunyard et al. . |
| 4,215,397 | 7/1980 | Hom . |
| 4,216,398 | 7/1980 | Burkett et al. . |
| 4,253,148 | 2/1981 | Johnson . |
| 4,263,647 | 4/1981 | Merrell et al. . |
| 4,267,458 | 5/1981 | Uram et al. . |
| 4,283,773 | 8/1981 | Daughton et al. . |
| 4,301,351 | 11/1981 | Mathews . |
| 4,306,292 | 12/1981 | Head, III . |
| 4,314,342 | 2/1982 | McNeir et al. . |
| 4,325,120 | 4/1982 | Colley et al. . |
| 4,334,226 | 6/1982 | Merback . |
| 4,344,127 | 8/1982 | McDaniel et al. . |
| 4,344,138 | 8/1982 | Frasier . |
| 4,356,550 | 10/1982 | Katzman et al. . |
| 4,365,295 | 12/1982 | Katzman et al. . |
| 4,365,297 | 12/1982 | Grisham, Jr. . |
| 4,415,965 | 11/1983 | Imazeki et al. . |
| 4,423,594 | 1/1984 | Ellis . |
| 4,445,180 | 4/1984 | Davis et al. . |
| 4,449,180 | 5/1984 | Ohshima et al. . |
| 4,453,229 | 6/1984 | Schaire . |
| 4,455,602 | 6/1984 | Baxter, III et al. . |
| 4,455,622 | 6/1984 | Loskorn et al. . |
| 4,473,883 | 9/1984 | Yoshida et al. . |
| 4,478,783 | 10/1984 | Broadwater . |
| 4,484,275 | 11/1984 | Katzman et al. . |
| 4,486,830 | 12/1984 | Taylor, Jr. et al. ......... 364/141 |
| 4,489,377 | 12/1984 | Mawyer et al. ......... 364/474.2 |
| 4,514,846 | 4/1985 | Federico et al. . |
| 4,521,847 | 6/1985 | Ziehm et al. . |
| 4,525,780 | 6/1985 | Bratt et al. . |
| 4,530,134 | 7/1985 | Hosel . |
| 4,531,182 | 7/1985 | Hyatt . |
| 4,550,366 | 10/1985 | Toyama et al. ......... 364/136 |
| 4,558,419 | 12/1985 | Kanematsu et al. ......... 364/474.2 |
| 4,562,529 | 12/1985 | Drummond . |
| 4,564,102 | 1/1986 | Mori et al. . |
| 4,570,217 | 2/1986 | Allen et al. . |
| 4,583,280 | 4/1986 | Corrigan et al. . |

(List continued on next page.)

OTHER PUBLICATIONS (PLC) for Temperature, Position, Velocity, and Pressure Control of Injection Molding," 1988, pgs. 1397–1404.

Dove, "Process Design Automation: The key to the 90's from Proceedings, Auto-Fact '88," 1988, pgs. 10/13–10/30.

Author Unknown, "Adatek System 10 User's Guide," Aug. 13, 1989, pp. 1–121.

"Software Design of a Robot Controller," IECON '85, IEEE, pgs. 447–451, Author Gomas and Taylor.

Collins and Ketelhut, "The Impact of Technological Advances on Programmable Controllers," 2nd Design, Automation Conference, IEEE, 1985.

Schillinger and Kaufman, "A High Level Control Language Based on Functional Programming," IECON '85, IEEE, pgs. 788–793.

Divan, "A Dynamically Reprogrammable Micro-Sequencer for Control of High Speed Processes," IECON '85, IEEE, pgs. 419–424.

Oba, Komada, Tashiro, and Matsumoto, "Description Method of Control Logic for Discrete System Using Production," IECON '85, IEEE, pgs. 777–781.

Bell and Williamson, "Self-Diagnostic Digital Controller Systems, "IECON '85, IEEE, pgs. 85–90.

Baba, Tamasaki, Nakanishi, "Development of a Process Computer Control System for a New Billet Mill," IECON '85, IEEE, pgs. 557–562.

Errico, "Structured Approach Aids Design of Digital Process Control Logic," Control Engineering, 1984, pgs. 97–100.

Sutherland, H.A., Bose, D.K., and Somuah, L.B., "A State Language for the Sequencing in a Hybrid Electric Vehicle," IEEE, pgs. 45–50, Nov. 4, 1983.

Waite, R., "PC Study Reveals User Wants and Needs," Instrumentation and Control Systems, Feb. 2, 1983, pgs. 59–60.

Morris, H.M., "Fast Growing PC Market Encourages Wide Range of Product Offerings," Control Engineering, Jan. 1983, pgs. 57–91.

Valette, Courvoisier, Bigou, Albu Kerque "A Petri Net Based Programmable Logic Control," Computer Applications in Production and Engineering, 1983, pgs. 103–116.

Hsu, "Decomposition of Large Scale Systems—A Numerical Approach," 1983, pgs. 715–718.

Sundareshan and Murcladhar, "Hierarchical Schemes for Adaptive Routins and Flow Control in Large Computer Networks," 1983.

Grzelak, Lewis, Gilpin and Shelton, "Comparison of State Transition Techniques and Relay Ladder Logic Techniques for Industrial Machine Control," 1983.

Hopkins, Jr., A.L., "Software Issues in Redundant Sequential Control," IEEE Transaction on Industrial Electronics, pgs. 273–278, Nov. 1982.

Johnsonbaugh and Murata, "Petri Nets and Marked Graphs—Mathematical Models of Concurrent Computation," Oct. 1982, pgs. 552–566.

Kerr, "The Controversy over the use of SPRT and GLR Techniques and Other Loose-Ends in Failure Detection," Oct. 1982, pgs. 966–977.

Ellis, "PC Diagnostics Adapt to Limited Process Changes," Control Engineering, Sept. 1982, pgs. 210–220.

(List continued on next page.)

U.S PATENT DOCUMENTS

| | | |
|---|---|---|
| 4,591,967 | 5/1986 | Mattes et al. . |
| 4,604,714 | 8/1986 | Putnam et al. . |
| 4,608,628 | 8/1986 | Saito et al. ............. 364/146 |
| 4,620,273 | 10/1986 | Mitani et al. . |
| 4,633,387 | 12/1986 | Hartung et al. . |
| 4,638,227 | 1/1987 | Katayama et al. ......... 364/184 |
| 4,639,864 | 1/1987 | Katzman et al. . |
| 4,648,068 | 3/1987 | Ninnemann et al. . |
| 4,651,601 | 3/1987 | Sasaki .................. 364/474.2 |
| 4,670,834 | 6/1987 | Byal et al. . |
| 4,672,535 | 6/1987 | Katzman et al. . |
| 4,672,537 | 6/1987 | Katzman et al. . |
| 4,679,045 | 7/1987 | Sadamori et al. . |
| 4,688,166 | 8/1987 | Schneider . |
| 4,689,739 | 8/1987 | Federico . |
| 4,691,289 | 9/1987 | Thaden et al. . |
| 4,695,946 | 9/1987 | Andreasen et al. . |
| 4,698,629 | 10/1987 | Mori et al. . |
| 4,700,313 | 10/1987 | Takagawa ............ 364/474.19 |
| 4,723,219 | 2/1988 | Beyer et al. . |
| 4,740,891 | 4/1988 | Kirkpatrick . |
| 4,742,443 | 5/1988 | Rohn et al. . |
| 4,750,150 | 6/1988 | Weppler . |
| 4,758,961 | 7/1988 | Uemura et al. ............ 364/184 |
| 4,760,521 | 7/1988 | Rehwald et al. . |
| 4,769,761 | 9/1988 | Downes et al. . |
| 4,782,447 | 11/1988 | Ueno et al. . |
| 4,796,189 | 1/1989 | Nakayama et al. . |
| 4,799,141 | 1/1989 | Drusinsky et al. ......... 364/141 |
| 4,807,116 | 2/1989 | Katzman et al. . |
| 4,817,091 | 3/1989 | Katzman et al. . |
| 4,817,092 | 3/1989 | Denney . |
| 4,829,445 | 5/1989 | Burney . |
| 4,835,730 | 5/1989 | Shimano et al. . |
| 4,837,704 | 6/1989 | Lengefeld . |
| 4,837,730 | 6/1989 | Cook et al. . |
| 4,837,735 | 6/1989 | Allen et al. . |
| 4,851,985 | 7/1989 | Burror et al. ............ 364/474.19 |
| 4,858,101 | 8/1989 | Stewart et al. . |
| 4,858,102 | 8/1989 | Lovrenich ................ 364/136 |
| 4,876,640 | 10/1989 | Shankar et al. . |
| 4,888,692 | 12/1989 | Gupta et al. . |
| 4,905,181 | 2/1990 | Gregory . |
| 4,926,369 | 5/1990 | Hokenek et al. . |
| 4,933,897 | 6/1990 | Shankar et al. . |
| 4,939,643 | 7/1990 | Long et al. . |
| 4,945,508 | 7/1990 | Benejean . |

OTHER PUBLICATIONS

Tsach, "Failure Detection and Location in Process Control Integrating a New Model Based Techniques with Other Methods," Sept. 1982.
O'Connor, Allan Joseph, "A CRT-Based State Transition Language of Industrial Sequential Control," June 1981.
Gander and Licchti, "State Language for Real-Time Process Control," 1981 pgs. 27–28.
Yenersoy, O., "Microcomputer Software and Hardward Design Techniques for Industrial Logic Controllers Using Mixed Events," 1981, pgs. 412–417.
Tugnait, "Detection and Identification of Abrupt Changes in Liner Systems," 1981, pgs. 960–965.
Dornfeld, D.A., Auslander, D.M., and Sagues, P., "Microprocessor Controlled Manufacturing Processes," Dec. 1980, pgs. 34–41.
Morrow and Robinson, "An Analysis Language for Real Time Control Systems," Sept. 1980, pgs. 900–904.
Deltano, D., "Programming Your PC," Instrumentation and Control Systems, Jul. 1980, pgs. 37–40.
Takahashi, H., "An Automatic Controller Prescription Language," IEEE Transactions on Software Engineering, Jan. 1980, pgs. 53–64.
Bartlett, Peter G., "Advantages of Controlling Transfer Lines Using Distributed Control," IEEE, 1980.
Auslander, D.M., Dornfeld, D., and Sagues, P., "Software for Microprocessor Control of Mechanical Equipment," pgs. 71–77, 1980.
Groumpous and Leros, "Controlling Large Scale Systems Using a Dynamical Hierarchical Approach," p. 708, 1980.
Maciejowski, "A Database Approach to Computer Aided Control System Design," 1980, pgs. 872–874.
Kompman, "Subtle Control Trends Important to Successful Products," Control Engineering p. 49, Feb. 1980.
Landay, "State Description Techniques Applied to Industrial Machines," 1979, pgs. 32–40.
Smith, Gordon, "Converting Relay Logic to Software," Aug. 24, 1978.
Walker, G.R., "The Formal Specification and Control of Sequential Processes Using the State Method," June 1978.
Kompass, "Multiprocessor Concept Lends to PLC Hierarchies," Control Engineering, p. 47, Jan. 1976.
Dietz, R.O., "Programmable Controllers in Batch Processing," pgs. 39–43, May 1975.
Saito, et al., "Electronics Control for Steel Making Industry," Hitachi Review, pgs. 201–207, 1975.
Hopkins, Jr. and Quagliata, "State Transition Synthesis for Sequential Control of Discrete Machines," Oct. 1973, pgs. 1–41.
Wolfe, P.D., "A Computer Language for Control of Autonomous Industrial Equipment," June 1973, pgs. 1–104.
McPhillips, A.S., "Designing Logic with Software," pgs. 7–11, date unknown.
Author unknown, "Back-up Flight Control System," pgs. 540–545, date unknown.
Kahn, et al., "An Architecture for Trouble-Shooting Systems," pgs. 292–293, date unknown.
Patterson, R.A., "Development of Machine Controlled Software Using State Programs," pgs. 2–7, date unknown.

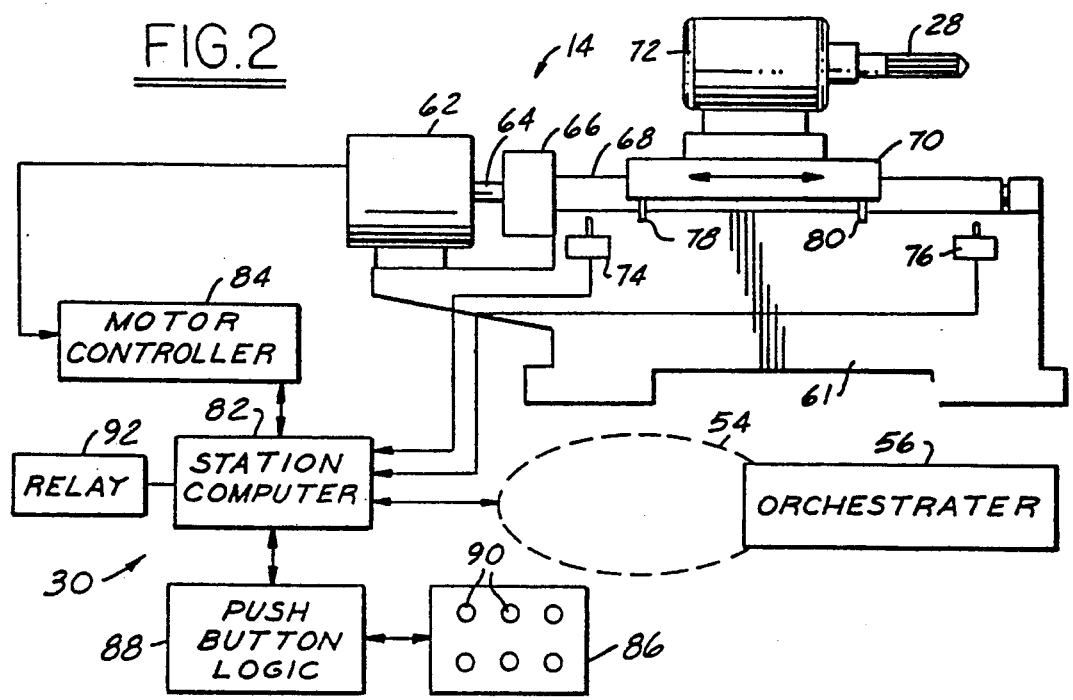
FIG.2
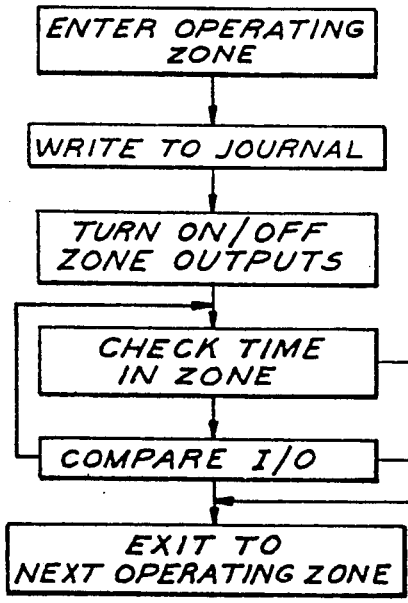
FIG.5
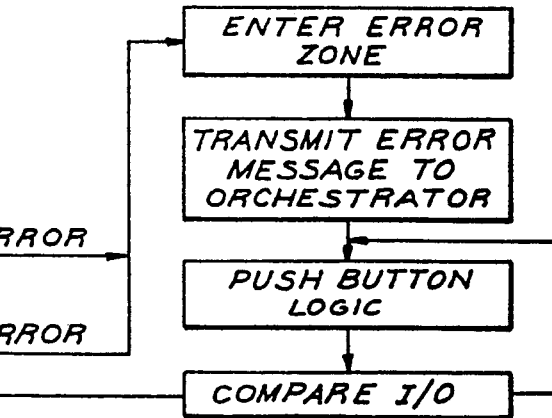
FIG.8
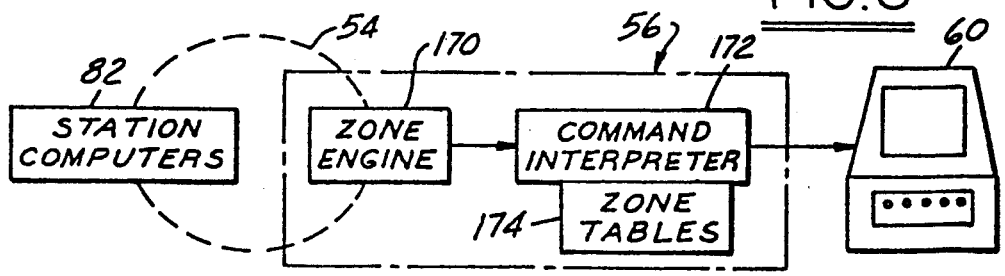

| MECHANISM ZONE TABLE | MECHANISM NAME __SLIDE__ |
| --- | --- |
| | APPLICABLE STATIONS _____ |

| ZONE NUMBERS (REF) | ZONE NAMES | I/O NAMES | ADVANCED UNIT SWITCH | RETURNED UNIT SWITCH | ADVANCE MOTION PWR | RETURN MOTION PWR | | | | |
| --- | --- | --- | --- | --- | --- | --- | --- | --- | --- | --- |
| | | I/O TYPE INPUT=1 OUTPUT=0 | 1 | 1 | 0 | 0 | | | | |
| 1 | RETURNED | | 0 | 1 | 0 | 0 | | | | |
| 2 | STOPPED BETWEEN | | 0 | 0 | 0 | 0 | | | | |
| 3 | ADVANCED | | 1 | 0 | 0 | 0 | | | | |
| 4 | ADVANCING FROM RETURNED | | 0 | 1 | 1 | 0 | | | | |
| 5 | ADVANCING BETWEEN | | 0 | 0 | 1 | 0 | | | | |
| 6 | ADVANCING ON TO ADVANCED | | 1 | 0 | 1 | 0 | | | | |
| 7 | RETURNING ONTO RETURNED | | 0 | 1 | 0 | 1 | | | | |
| 8 | RETURNING BETWEEN | | 0 | 0 | 0 | 1 | | | | |
| 9 | RETURNING FROM ADVANCED | | 1 | 0 | 0 | 1 | | | | |
| 10 | ERROR | | X | X | 0 | 0 | | | | |

LEGEND:  [0] MUST BE OFF   [1] MUST BE ON   [X] IGNORE

FIG. 4B

| PART PROCESSING RECORDS | DONE |
|---|---|
| DRILL #1 | ✓ |
| REAM #1 | ✓ |
| TAP #1 | |
| DRILL #2 | |
| REAM #2 | |
| TAP #2 | |
| DRILL #3 | |
| REAM #3 | |
| | |
| | |

| MECHANISM ZONE TABLE | MECHANISM NAME: _____ |
|---|---|
| | STATION NAME: 5L |

| ZONE NUMBERS (REF) | ZONE NAMES ① | I/O NAMES ② ERROR RESET | ADVANCE SLIDE | RETURN SLIDE |
|---|---|---|---|---|
| | | C | C | C |
| 1 | INITIALIZING | X | X | X |
| 2 | RETURNED | X | 0 | X |
| 3 | ADVANCING FROM RETURNED | X | 1 | X |
| 4 | ADVANCING BETWEEN | X | 1 | X |
| 5 | ADVANCED | X | X | 0 |
| 6 | RETURNING FROM ADVANCED | X | X | 1 |
| 7 | RETURNING BETWEEN | X | X | 1 |
| 8 | STOPPED BETWEEN | X | 0 | 0 |
| 9 | COASTING TO STOP | X | X | X |
| 10 | ERROR DEFAULT ③ | 0 | X | X |

I/O TYPE

I = PHYSICAL INPUT
C = COMMAND INPUT

O = PHYSICAL OUTPUT
R = REQUEST OUTPUT
M = MOS (MACHINE OPERATING SYSTEM) OUTPUTS

LEGEND: [0] MUST BE OFF    [1] MUST BE ON

FIG. 7A

| MECHANISM ZONE TABLE | MECHANISM NAME: _____ STATION NAME: _____ | | | | | |
|---|---|---|---|---|---|---|
| I/O TYPE<br>I = PHYSICAL INPUT<br>C = COMMAND INPUT<br>O = PHYSICAL OUTPUT<br>R = REQUEST OUTPUT<br>M = MOS (MACHINE OPERATING SYSTEM) OUTPUTS | I/O NAMES → | ERROR RESET | ADVANCE SLIDE | RETURN SLIDE | ADVANCED UNIT SWITCH | RETURNED UNIT SWITCH |
| ZONE NAMES ① | | C | C | C | I | I |
| 1 INITIALIZING | | X | X | X | X | X |
| 2 RETURNED | | X | 0 | X | 0 | 1 |
| 3 ADVANCING FROM RETURNED | | X | 1 | X | 0 | 1 |
| 4 ADVANCING BETWEEN | | X | 1 | X | 0 | 0 |
| 5 ADVANCED | | X | X | 0 | 1 | 0 |
| 6 RETURNING FROM ADVANCED | | X | X | 1 | 1 | 0 |
| 7 RETURNING BETWEEN | | X | X | 1 | 0 | 0 |
| 8 STOPPED BETWEEN | | X | 0 | 0 | 0 | 0 |
| 9 COASTING TO STOP | | X | X | X | X | X |
| 10 ERROR: DEFAULT | | O | X | X | X | X |

LEGEND: ⓪ MUST BE OFF   ① MUST BE ON

TRANSITION TO ERROR ZONE CAUSES MESSAGE PROCESS TO COMPOSE AN ERROR MESSAGE

FIG. 9A

DISTRIBUTED LOGIC CONTROL SYSTEM AND METHOD

This application is a continuation of application Ser. No. 463,868 filed Jan. 5, 1990, now abandoned which is a continuation of application Ser. No. 340,435 filed Apr. 19, 1989, now abandoned, which was a continuation of application Ser. No. 038,018 filed Apr. 14, 1987 which matured into U.S. Pat. No. 4,858,102 having an issue date of Aug. 15, 1989. Ser. No. 038,018 was itself a continuation-in-part of application Ser. No. 757,279 filed Jul. 19, 1985 and now abandoned. Reference is also made to U.S. Pat. Nos. 4,621,200 and 4,705,900 which issued Nov. 4, 1986 and Nov. 10, 1987 respectively; and to co-pending continuation-in-part application Ser. No. 335,338 filed Apr. 10, 1989 with priority based on application Ser. No. 757,225 filed Jul. 19, 1985.

BACKGROUND OF THE INVENTION

Automated production lines typically include many stations at which work is performed on a workpiece by a series of tools. A workpiece is clamped in position at each work station, and the tools at the several work stations engage the workpiece. The tool is then withdrawn at each work station, and the workpieces are unclamped and transferred simultaneously to the next work stations by a single transfer mechanism. The automotive industry is an example of an industry with high usage of automated production lines to produce engine blocks, for example. An engine block casting is passed successively through a series of work stations which mill, bore, drill, hone, gage, etc. It is not uncommon to have sixty work stations in such an automated production line. The times required to perform the several operations may be different, but the parts cannot be unclamped and transferred until all stations are finished because motion of a single transfer mechanism moves all parts.

Individual machine control systems generally include an automatic mode of operation wherein the machine is automatically cycled through a work sequence. Relay ladder logic commonly has been used to define the machine sequences, whether the logic is effected by relays or programmable controllers. The typical relay ladder logic diagram is a massive listing of relay, switch and solenoid conditions without an indication of logic flow which, while easy to read, is difficult to translate into the logic conditions intended to be represented. In addition, a large number of implied conditions exist that are not depicted. For example, a relay ladder with twenty elements (switches, relays, solenoids, etc.) embraces well over one million possible combinations of conditions. As a practical matter only a small fraction of these conditions, those necessary to make the system work, are considered by the machine designer and encoded into the logic scheme. Potential problems abound. Some planned conditions may be omitted, and unplanned conditions may be present, all with potentially serious consequences.

The programmable logic controller (PLC) was introduced with the hope that the massive racks of relays wired together in a permanent logic network could be replaced by a more reliable, smaller and readily reprogrammable electronic package. Although the PLC was designed to replace relay controls, its design explicitly seeks to replicate, in the design media, the relay ladder logic used by the technicians. Reprogrammability has proven to be a mixed blessing. Initial reprogramming is always needed as the system is set up and to meet product design changes. Any change made to the program logic requires a corresponding modification to associated diagnostic programming so the latter can properly reflect errors in the altered logic. The ease of making changes can allow modifications to be made by any semi-qualified person. Unfortunately, there is often no record of changes made, and there is therefore the possibility that the documentation may not reflect the actual program. This is a sufficiently serious problem for many production facilities that they are investing heavily in add-on equipment to monitor program changes. Furthermore, the increase in number of Input/Output (I/O) points desired by users and consequent greater complexity of controls have driven PLC manufacturers to push the PLC design to larger and larger units. These very large units are well designed to meet the needs of central chemical plant control rooms, for example, but are too slow for the fast-cycle automation, such as transfer lines.

A significant cost of automated production lies in system "down-time"—i.e. time in which the automated system is non-productive—which may range between 50% and 60% during production shifts. Total down-time may be visualized as consisting of three segments: diagnosis, repair and restart. Analyses show that there are many causes of down-time including: many potential sources of unintended stoppage, variable delays in bringing the appropriate skills to bear on the problem, repair times that vary from minutes to hours, and a significant restart time needed to return the machine to a "ready for automatic cycle" condition after all repairs have been made. Down-time is a direct consequence of the high degree of complexity required to perform a large number of machining and part handling operations with the minimum of operator intervention. While lower equipment failure rates are a high priority objective, it is widely believed that reducing time to return to production—i.e., restart time—is the major area of opportunity for improvement.

Thus, a particular problem which has plagued the art involves restart of an automated system after shutdown. Typically, operators or technicians must examine the status of workpieces at the individual stations and manually cycle the individual stations so that all stations are at a common point in the overall operating cycle. In a system which includes sixty work stations, for example, substantial time is required to restart the system in this manner after shutdown. Furthermore, in the event that an error is made and a workpiece is transferred to the next work station without the previous operation having been performed, substantial damage is likely to both the workpiece and the operating mechanism at the station, resulting not only in further shutdown of the system but in costly repair.

OBJECTS AND SUMMARY OF THE INVENTION

It is therefore a general object of the present invention to provide a control system and method of the described type which are characterized by increased efficiency, speed and reliability, and by decreased cost and complexity.

A more specific object of the invention is to provide a distributed machine control system and method which are constructed in such a way as to be automatically self-diagnostic or "autonostic" in operation, which provide to the operator a clear concise English-language explanation of the cause of failure, and which are thus effective in reducing time required to diagnose the cause of a system failure.

A further and yet more specific object of the invention is to provide a control system and method wherein each work station contains a complete history of system operations performed on the workpiece at that station, so that the work station will not perform its operation on the workpiece in the event that preceding prerequisite operations have not been performed, and so that the system restart can be implemented automatically without requiring visual inspection and manual intervention by operators or technicians.

The present invention is directed to a system and method for controlling operation of a plurality of elements in an automated process, such as a production process, and indicating error conditions as they occur. In accordance with the invention, the machine system is divided into a plurality of individually controlled "mechanism." A "mechanism" is a single action device—i.e., having a single motion—which cannot interfere with itself. In the example discussed in detail, such mechanism comprises a ream slide which moves toward a workpiece to bring the reaming bit into working engagement, and then moves to a returned position spaced from the workpiece so that the piece may be transferred. The ream motor carried by the slide, if controlled, would be a separate "mechanism" because a different motion is involved. Likewise, the workpiece clamp at the reaming station would comprise a separate "mechanism."

Each unique set of input and output conditions of the various mechanism elements defines a unique logic state or zone. Thus, there are defined a multiplicity of valid mechanism logic states or zones, each having a unique input/output image and each corresponding to a valid physical state of the mechanism. A predetermined set of zones, productive zones representing designed mechanism operating states, is stored in a zone table. All zones not explicitly defined in the zone table are automatically treated as error zones. A zone engine automatically cycles to observe any change in mechanism input/output image. Any change in inputs from the various mechanism elements automatically transfers action to the unique zone associated with such inputs, resulting in corresponding changes in control outputs to the mechanism elements and/or display of an error message as appropriate. Thus operation is automatically transferred among valid zones, including the error zone, along a plurality of allowed or available paths.

Zone logic operation so described possesses a number of distinct advantages over the art. For example, every change in I/O image automatically transfers operation to a succeeding zone. If the next zone is a valid zone, operation proceeds. However, if the next zone is an error zone, the I/O image which led to entry into the error zone provides a ready indication of the source of mechanism failure. Therefore, error diagnostics are unnecessary. Furthermore, by programming the system mechanism as a function of constraints rather than timed actions, the individual mechanisms, and hence the overall system, automatically operate at maximum speed.

In accordance with another feature of the invention for automatic generation of error messages, each logic zone and each input/output image has associated therewith a verbal description according to its function, for example "valve seat ream mechanism slide" in the example of the disclosure. Motion or action zones have associated verb phases, such as "advancing between" and input and output (I/O) elements are named with nouns such as "advanced limit switch", etc. The zone engine continually examines the actions taking place or the lack of action, and the conditions of the mechanism elements. When a fault occurs, i.e. when the combination of action and element conditions does not represent a productive situation, the names of the zones and inputs and outputs are combined to automatically compose a unique readily understood error message complete with verbs, nouns and objects in accordance with standard language construction. If the system programming is changed by the designer, the diagnostics and error message composition automatically follow with no additional programming. The system will automatically compose its own unique error message in accordance with the changes.

A machine control system in accordance with a preferred embodiment of the present invention includes a plurality of work stations each for performing a preselected operation on a workpiece, such as drilling, reaming or tapping a hole, and a transfer mechanism for transferring a series of workpieces among the work stations in a predetermined sequence. Each of the work stations includes at least one mechanism for performing the preselected operation on a workpiece at the associated work station and an electronic controller for controlling operation of the mechanism. The electronic controllers are electrically serially interconnected to each other. Each controller includes a system memory section which includes a complete record of operations performed on all workpieces in the system. This record is updated following each machine cycle. Thus, in the event of shut-down, each station contains information necessary for restart relative to the workpiece at that station.

In accordance with another feature of the invention, the part history record is employed at each work station to inhibit operation of the mechanism in the event that prerequisite previous operations have not been performed. For example, in the example of a valve seat reaming station, operation of the reaming slide against the workpiece is inhibited if the history of the workpiece indicates that the hole has not been drilled at a previous station.

BRIEF DESCRIPTION OF THE DRAWINGS

The invention, together with additional objects, features and advantages thereof, will be best understood from the following description, the appended claims and the accompanying drawings in which:

FIG. 2 is a more detailed functional block diagram of the reaming work station in FIG. 1;

FIG. 4B is a corresponding zone table illustration;

FIG. 5 is a flow chart illustrating operation of zone engine logic;

FIGS. 7A, 7B and 7C are functional block diagrams illustrating the error message generator at the orchestrator computer in FIG. 1;

FIG. 8 illustrates a more complete mechanism zone table for the ream slide mechanism of FIGS. 1 and 2; and FIGS. 9A and 9B illustrate error message operation at the orchestrator for an exemplary failure at the ream slide station.

DETAILED DESCRIPTION OF PREFERRED EMBODIMENT

Figure 1:
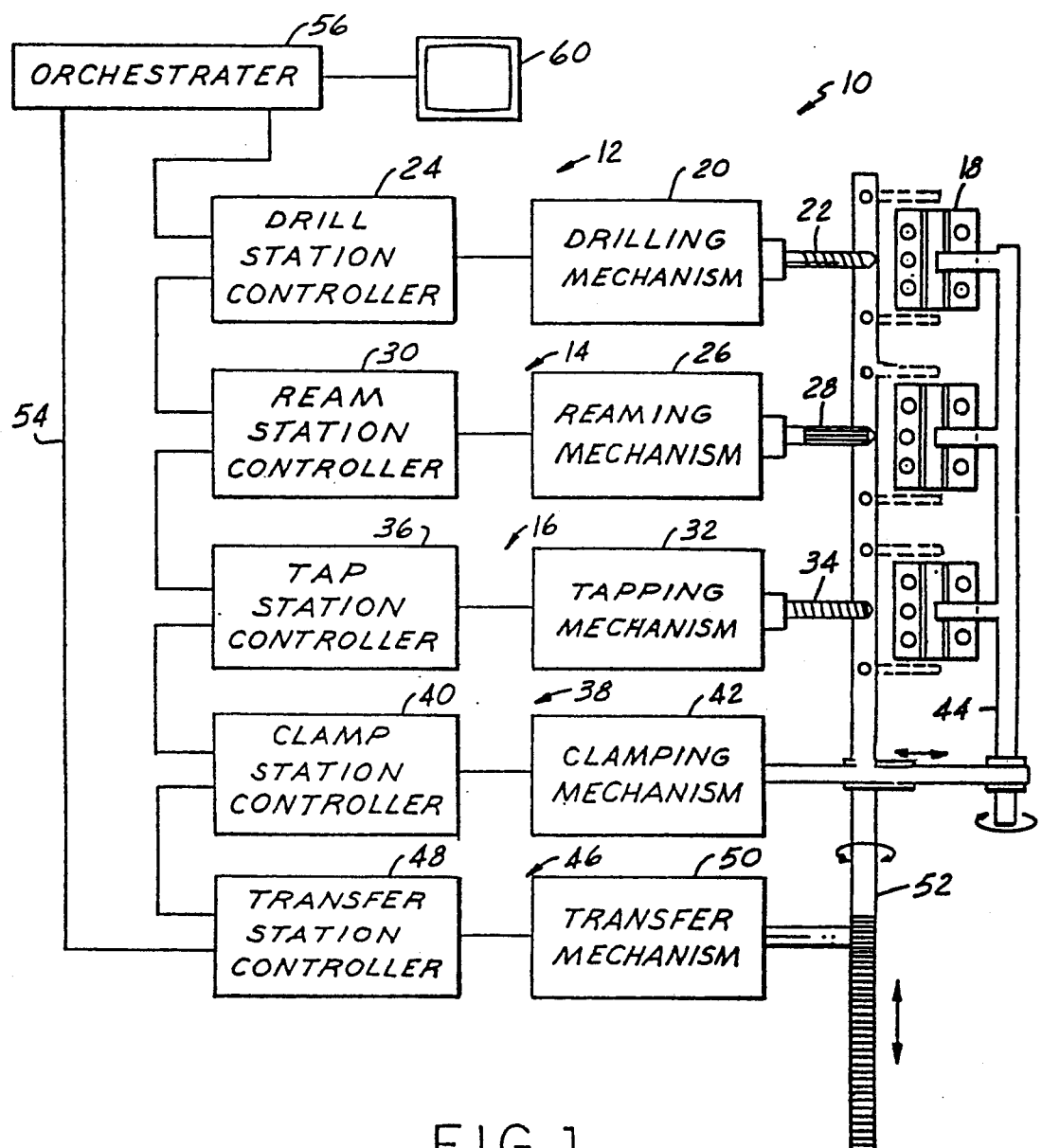
FIG. 1 is a functional block diagram of a machine control system embodying the present invention.

FIG. 1 illustrates a machine control system 10 in accordance with an exemplary embodiment of the invention as comprising a series of work stations 12, 14, 16 for sequentially performing operations on a continuing series of workpieces 18 such as engine blocks. Work station 12 in the exemplary embodiment of FIG. 1 comprises a drilling station which includes a drilling mechanism 20 coupled to bit 22 for drilling a hole at a preselected location in a workpiece 18 and controlled by a drill station controller 24. Likewise, work station 14 (FIGS. 1 and 2) comprises a reaming station which includes a reaming mechanism 26 with a bit 28 for reaming the hole drilled at station 22, and a ream station controller 30 coupled to mechanism 26. Work station 16 includes a tapping mechanism 32 having a bit 34 for tapping the hole drilled at station 12 and reamed at station 14, and a controller 36 coupled to tapping mechanism 32. Station controllers 24, 30, 36, 40 and 48 are serially connected in a communication loop 54 with an orchestrator computer 56 for controlling operation among the various work stations. Orchestrator 56 is coupled to a display 60 for indicating status, including system error messages, to an operator.

System 10 further includes a clamping station 38 with a controller 40 coupled through a clamping mechanism 42 to a clamping bar 44 or the like for selectively clamping workpieces 18 at stations 12-16, or for unclamping the workpieces for transfer between sequential stations. A transfer station 46 includes a transfer station controller 48 coupled through a transfer mechanism 50 to a bar 52 for selectively engaging workpieces 18 with clamp 44 retracted and moving workpieces 18 between stations 12, 14, 16 in sequence. It will be appreciated, of course, that system 10 illustrated in FIG. 1 is a simplified example of an automated machine system which may include several dozen work stations and a multiplicity of clamping and transferring stations for automated operation on workpieces 18. In this simplified example, there are at least five separately controllable mechanisms—i.e., the slides on which the drill, ream and tap motors are mounted, and the clamping and transfer actuators. It will be understood, however, that each station may include a plurality of controllable mechanisms, which may be coded and operated in the manner to be described without departing from the scope of the invention. Indeed, such expandability is an important advantage of the invention.

FIG. 2 illustrates reaming work station 14 as comprising a base 61 having a reversible electric motor 62 mounted thereon. Motor 62 has an output shaft 64 coupled through a gear transmission 66 to a work shaft 68. A machine slide 70 is slidably mounted on base 61 in engagement with worm shaft 68. A ream 72 rotates ream bit 28 for reaming a pre-drilled hole at a predetermined position in workpiece 18 (FIG. 1). Limit switches 74, 76 are positioned on base 61, and fingers 78, 80 on slide 70 engage limit switches 74, 76 at the extreme limits of travel of the machine slide. Limit switches 74, 76 are connected to the station computer 82 of ream station controller 30. Motor 62 is powered by a motor controller 84 which provides a feedback signal to computer 82 indicative of motor operation. Controller 84 is coupled to station computer 82. Computer 82 is also connected by communications loop 54 to orchestrator 56 (FIG. 1).

The general operation of reaming station 14 requires that slide 70 move off of returned limit switch 74 by energizing motor 62 to rotate lead screw 68 and move slide 70 forward until finger 80 engages advanced limit switch 76. At this point, motor 62 must be stopped and re-energized to rotate worm-shaft 68 in the opposite direction for reversing the direction of travel of machine slide 70 until finger 78 engages limit switch 74. A control panel 86 is connected to station computer 82 through logic circuitry 88 and includes pushbuttons 90 which indicate functions such as "start ream motor", "advance slide", "single step", "stop ream motor", "return slide", "automatic" and "manual". A watchdog relay 92 is connected to station computer 82 to shutdown station 14 if an error is detected.

Figure 3:
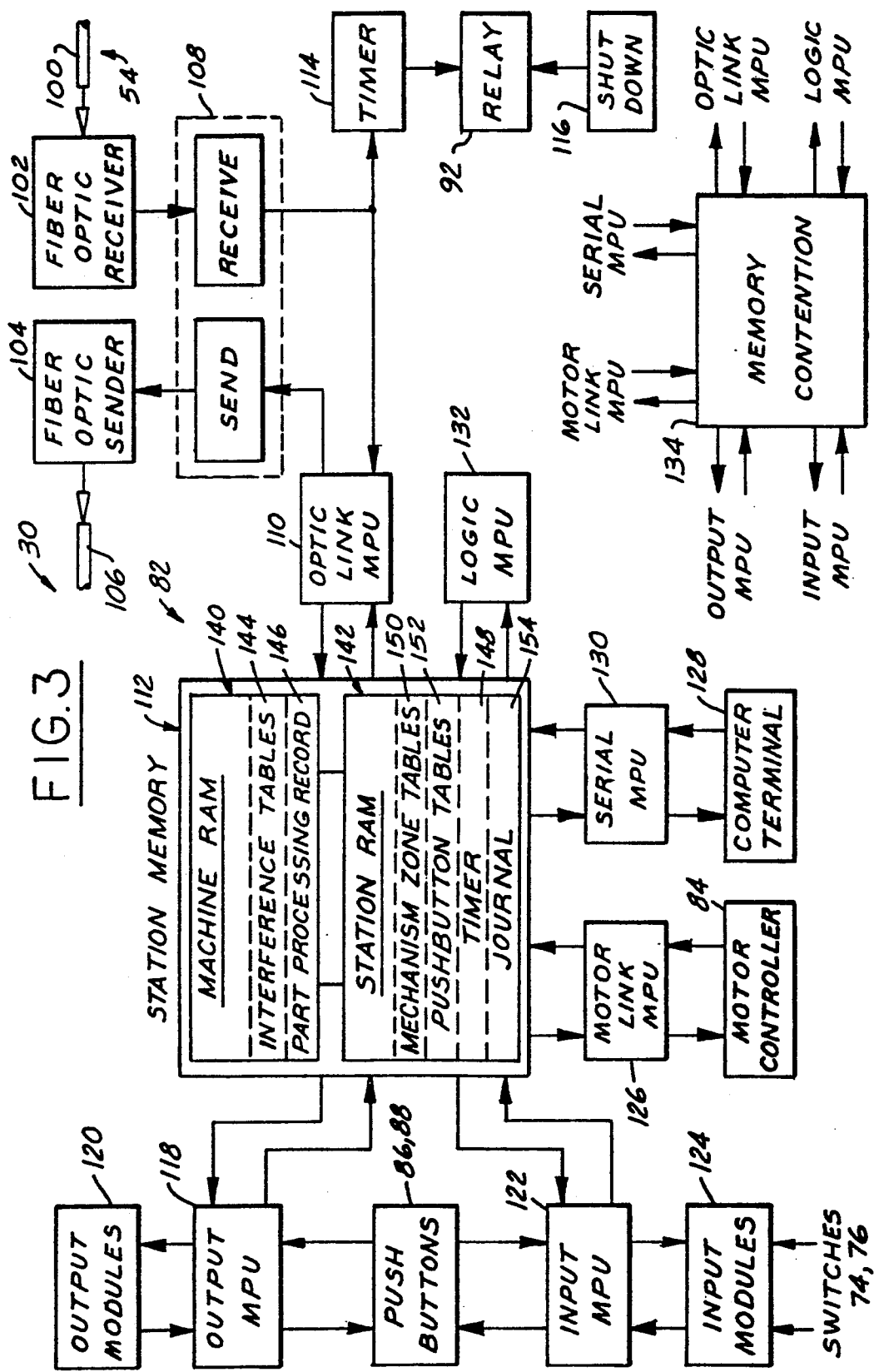
FIG. 3 is a functional block diagram of the reaming station controller in FIGS. 1 and 2.

FIG. 3 is a functional block diagram of ream station controller 30, including ream station computer 82 (FIGS. 1 and 2). Communications loop 54, which preferably comprises an optical communications loop, includes a fiber-optic cable 100 coupled to a fiber-optic receiver 102 in station computer 82 (FIGS. 1-3) for receiving signals from the upstream controller, in this case drill station controller 24, and a fiber-optic transmitter (sender) 104 coupled by a fiber-optic cable 106 in loop 54 to the downstream controller, in this case tap station controller 36. (The other of interconnection of loop 54 among controllers 24, 30, 36, 40 and 48 is irrelevant.) Transmitter 104 and receiver 102 are coupled through an isolator 108 to an optical link microprocessor unit or MPU 110. MPU 110 interfaces with a memory 112. Input information is stored in memory 112, and may be recalled and processed as desired. The receiver electronics are also coupled to a watchdog timer 114 which is connected to relay 92 (FIGS. 2 and 3) for terminating station operation in the event of a loss of signal on the receiver line. Relay 92 is also responsive to other suitable shutdown electronics 116.

Memory 112 is a public memory that is available to the several MPUs which comprise station computer 82. An output MPU 118 communicates with memory 112 and output modules 120 for connection of output signals to external devices. Output MPU 118 also provides signals to pushbutton logic 88 and operator pushbutton panel 86 (FIGS. 1 and 3). An input MPU 122 receives a signals from input modules 124, which are connected to station input devices such as switches 74, 76 in FIG. 2. A motor link MPU 126 couples memory 112 to motor controller 84 (FIGS. 2 and 3). An operator computer terminal 128 is coupled to memory 112 through the serial MPU 130. A logic MPU 132 communicates with memory 112 and executes a prestored operating system for controlling overall station operation. Since several MPUs have access to public memory 112, it is necessary to organize memory access. This is accomplished by the memory contention module 134, which preferably comprises a programmable logic array chip programmed in conventional fashion.

Drill station 12, tapping station 16, clamping station 38 and transfer station 46, and particularly the various station controllers 24, 36, 40 and 48, are preferably structurally similar to ream station 14 hereinabove described in detail in connection with FIGS. 2 and 3, the only difference being in the mechanism for performing work on the workpieces and in the prestored station operation system programs. Structure and operation of controllers 24, 30, 36, 40, 48 and 56 are as disclosed in greater detail in U.S. Pat. No. 4,621,200. Reference is made to such patent for a more detailed discussion of structure of the station controllers.

As illustrated in FIG. 3, memory 112 includes a section 140 of machine RAM in which identical information is stored for all controllers 24, 30, 36, 40 and 48 (FIG. 1), and a section 142 of memory dedicated specifically to that station—e.g., ream station 14. In general, machine RAM 140 is managed by orchestrator 56 (FIGS. 1 and 2) and contains information needed by all station controllers—e.g., station interference tables 144 and part processing record 146. Station RAM 142 is controlled by the station controller and contains information specific to the station in question—e.g., a time-in-zone memory 148, station mechanism zone tables 150, pushbutton logic tables 152 and a station journal 154. The various MPUs of controller 30 (in FIG. 3) can read all data in machine RAM 140, but can vary or update only data associated with station 14. The same is true, of course, for the other station controllers.

Station controllers 24, 30, 36, 40 and 48 are serially connected with orchestrator 56 in a closed communications loops as hereinabove noted, specifically a serial communications loop. Information is continually but separately received and transmitted around the loop by each station computer MPU 110 (FIG. 3). This information is a time division multiplex of command signals from the orchestrator to the various station computers, status information from the work station computers to the orchestrator, and miscellaneous data information including update of part processing records 146. The command, status and data information is contained in a continual series of individual information packets, specifically time division multiplexed digital information packets. Time division multiplexed closed-loop communication among the work station and orchestrator computers as hereinabove described is the subject of co-pending application Ser. No. 757,225 filed Jul. 19, 1985, to which reference is made for details of implementation.

Figure 4A:
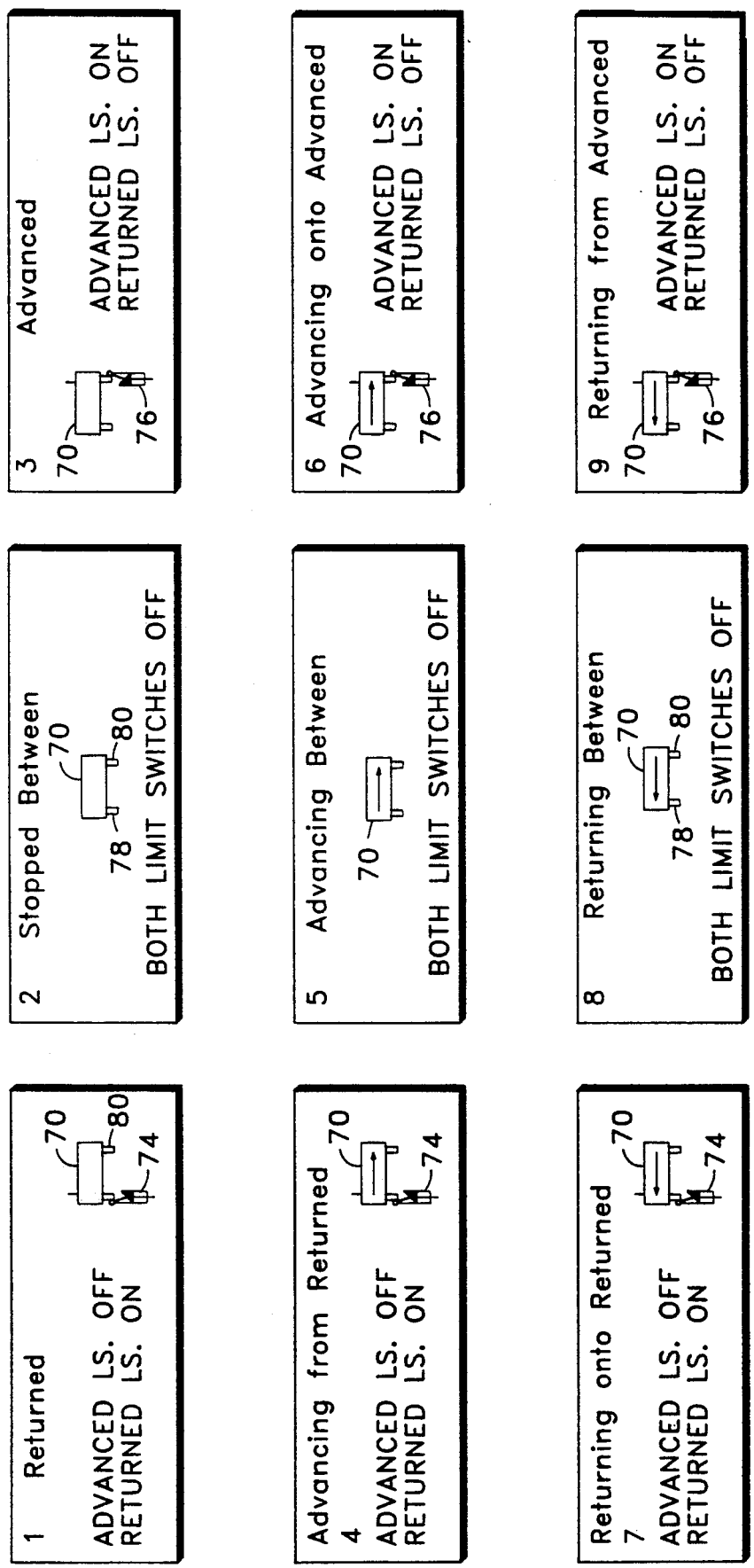
FIG. 4A is a pictorial illustration of a valid operating states or zones of the ream slide mechanism of FIG. 2.

FIG. 4A illustrates valid zones of operation of reaming mechanisms 26, and FIG. 4B is a zone table or chart listing the valid zones by name with corresponding I/O images. In zone 1, the ream slide 70 is RETURNED, the advanced limit switch 76 is turned off, the returned limit switch 74 is turned on and both advance and return power to motor 62 are turned off. In zone 2, drill slide 70 is STOPPED BETWEEN the advanced and return limit switches, so that both limit switches are turned off or provide a zero output, and neither advance nor return power is applied to the slide motor. In zone 3, the slide 70 is ADVANCED onto advanced limit switch 76, switch 76 is turned on, switch 74 is turned off, and all power is turned off. In zone 4, slide 70 is ADVANCING FROM RETURNED such that returned limit switch 74 is on, advanced limit switch 76 is off and advance power is applied to slide motor 62. In zone 5, slide 70 is ADVANCING BETWEEN the limit switches, both limit switches being turned off and advance power still being applied. In zone 6, slide 70 is ADVANCING ONTO ADVANCED limit switch 76, with advance power still applied but advanced limit switch 76 turned on. Zones 7, 8 and 9 named RETURNING ONTO RETURNED, RETURNING BETWEEN and RETURNING FROM ADVANCED are similar to zones 4, 5 and 6 except that return power rather than advance power is turned on.

Thus, it will be seen that FIGS. 4A and 4B represent nine valid zones which reflect all of the physically possible operative conditions of the physical mechanism. The total number of possible zones in equal to the number of states per I/O raised to the power of the number of available I/O conditions. Thus, in this example, each I/O has two possible states, and there are a total of four I/Os available, presenting sixteen total possible zones, including seven invalid zones. For example, there are three possible invalid zones in which both advanced limit switch 76 and returned limit switch 74 are turned on, three possible invalid zones in which both advance motion power and return motion power are turned on, and the seventh invalid zone in which all I/Os are turned on. However, in accordance with an important feature of the present invention, it is not necessary to define all invalid zones. Rather, only valid zones need be defined, and all invalid zones are grouped into a single ERROR zone, zone 10 in FIG. 4B, in which both advance and return power are turned off and an error message is presented at display 60 (FIG. 1). As will be described in detail hereinafter, and in accordance with yet another important feature of the present invention, such display message provides a verbal indication which combines zone names and I/O names in such a way that a complete description of the error condition is provided based upon the last valid zone in which the mechanism was operating prior to entry into the ERROR zone. The coded zone table of FIG. 4B, along with table corresponding to any other mechanisms at station 14, are stored in station RAM memory section 150 (FIG. 3).

FIG. 5 illustrates operation of zone engine processing within logic MPU 132 in FIG. 3. Upon entry into a valid operating zone—i.e., a zone for which I/O has been defined and tabulated in the manner illustrated in FIG. 4B and stored within mechanism zone table memory section 150 in FIG. 3—an appropriate entry is written to journal memory section 154, whereby station memory contains a record of station operation. Journal 154 may comprise a "flight recorder" type of memory in which only a preselected number of previous zone entries are retained for purposes of analysis as required upon occurrence of an error condition. Following entry to journal 154, the appropriate zone outputs are turned on or off. For example, if the mechanism enters zone 1 from zone 7 (FIG. 4B), power to slide motor 62 (FIG. 2) must be turned off. Timer memory section 148 is then checked to determine the amount of time spent in the previous zone, in this case the amount of time spent in zone 7 following entry thereto from zone 8. Each zone has an associated predetermined maximum time-in-zone which, if exceeded, indicates an error condition. Next, the I/O image is compared to those expected and, failing recognition of an expected I/O image, operation is transferred to the ERROR zone. Note that there is a delay between energization or de-energization of the zone outputs and comparison with I/O image in order to allow the output signals to assume the desired level. Operation then cycles through timer check and I/O comparison until a change in the I/O image causing exit to the next operating zone or exit to the ERROR zone.

This cycle is repeated continuously and operation transferred from zone to zone as appropriate unless transferred to the ERROR zone or otherwise halted, such as by manual termination of automatic cycle operation.

Upon entry to the ERROR zone (FIG. 5), an error message is transmitted to orchestrator 56 for generation of an error message (as will be described in greater detail in connection with FIGS. 8 and 9). Such error message includes station and mechanism names, the last valid zone in which the station operated (taken from journal 154 in FIG. 2), and the condition which caused the error indication—i.e., unexpected change in put or exceeding maximum time-in-zone. Pushbutton logic 88 (FIG. 2) is operative to permit manual correction of the error condition. When the I/O image indicates correction of the error and return to autocycle, operation returns to the next valid zone—i.e., the next operating zone indicated by I/O image.

Figures 6A, 6B:
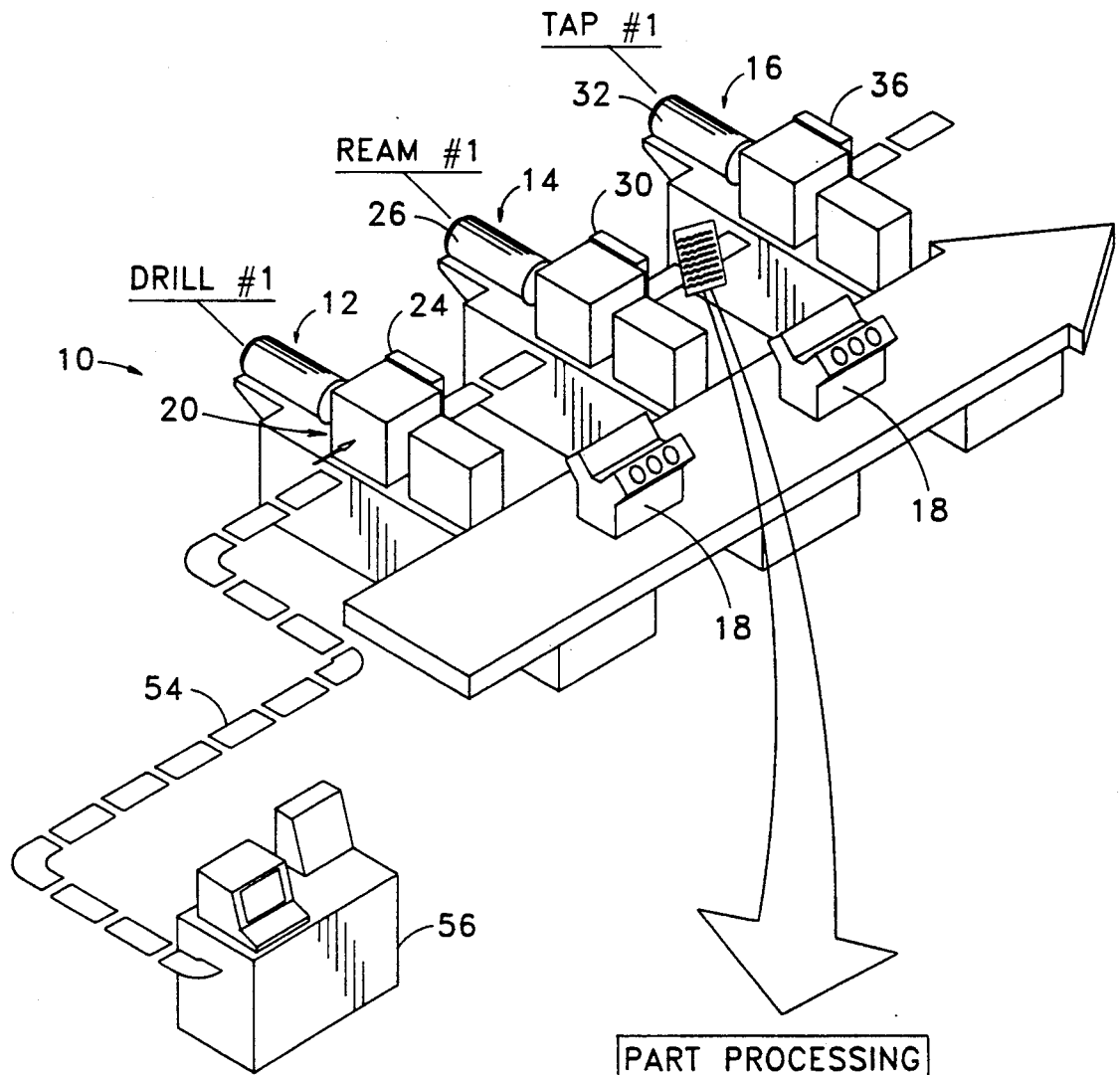
FIGS. 6A and 6B are schematic diagrams illustrating transmission of part history indicia between work station controllers.

FIG. 6A schematically illustrates an important feature of the present invention. That is, information is effectively transmitted between operating stations so that each station is effectively aware of the part processing history or record of a workpiece arriving at that station. Thus, for example, tapping mechanism 32 at station 16 will not attempt to tap a hole which has not been drilled at station 12 and reamed at station 14. (FIG. 6B) This feature of the invention not only prevents damage to the tapping bit at station 16 (which would eventually result in shutdown of the line because the tapping slide mechanism would remain too long in corresponding zone 5), but also permits restart of the line without manual inspection of all parts in the line and corresponding reset of the various stations. The processing records of all parts on the line are stored in memory section 146 (FIG. 3) at each station controller. The part process inhibit feature will be discussed in greater detail in connection with FIG. 7.

In accordance with another important feature of the invention, pushbutton logic 88 in ream station controller 30 (FIG. 2, as well as corresponding pushbutton logic in the other controllers) operates lighted pushbuttons 90 on panel 86 in such a way as to advise an operator of the operating status and/or availability for operation at the associated mechanism. More specifically, a pushbutton lamp flashes slowly to indicate that the action associated with that pushbutton will be implemented if the pushbutton is pressed. The lamp flashes rapidly to indicate that the associated action is currently being implemented, either automatically or through manual depression of the button as previously described. The lamp remains steadily lit to indicate that the associated action has been completed, again either manually or in the automatic mode of operation. An unlighted lamp indicates that the action associated with this pushbutton will not be implemented even if the pushbutton is depressed.

Figure 7B:
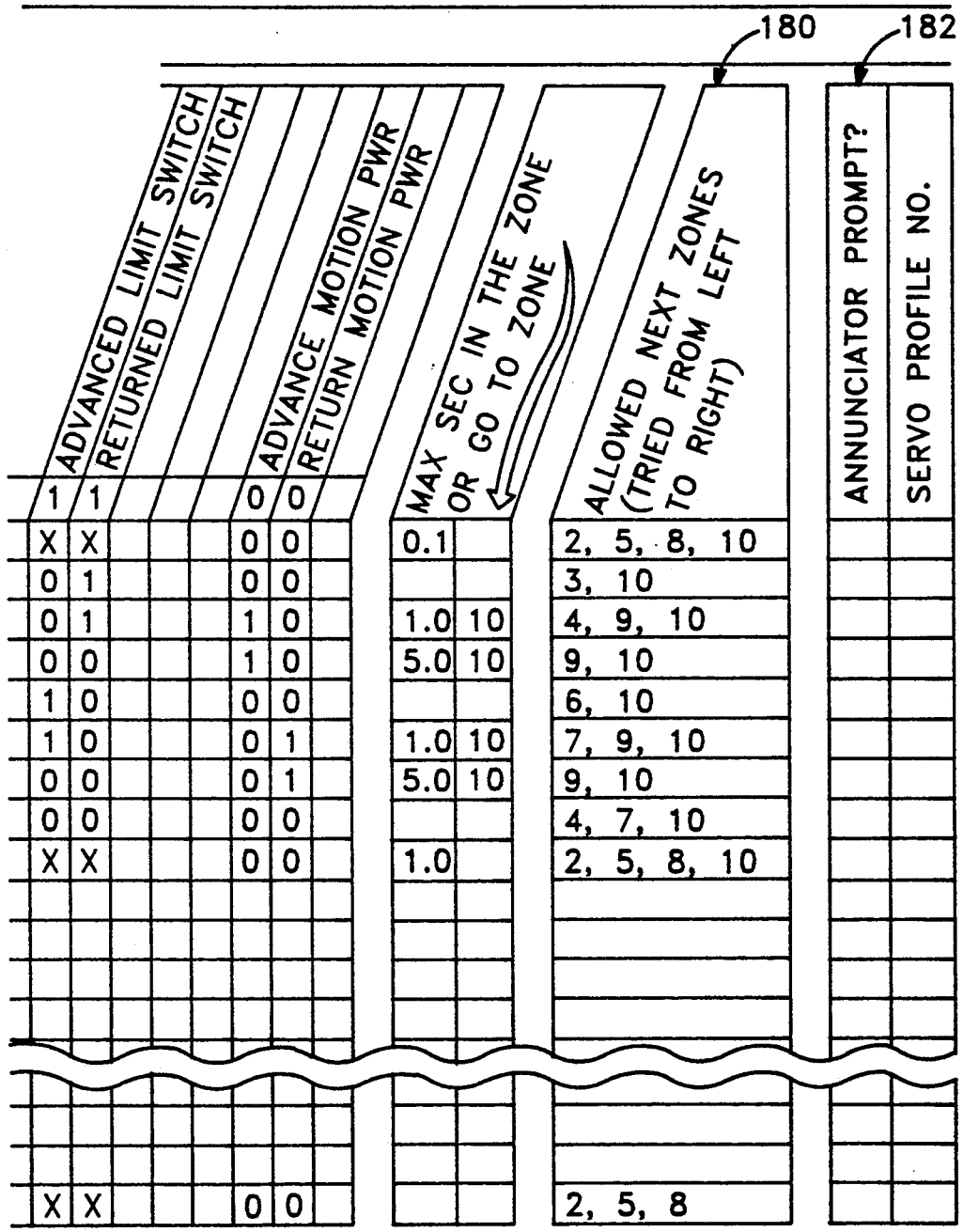
Figure 7C:
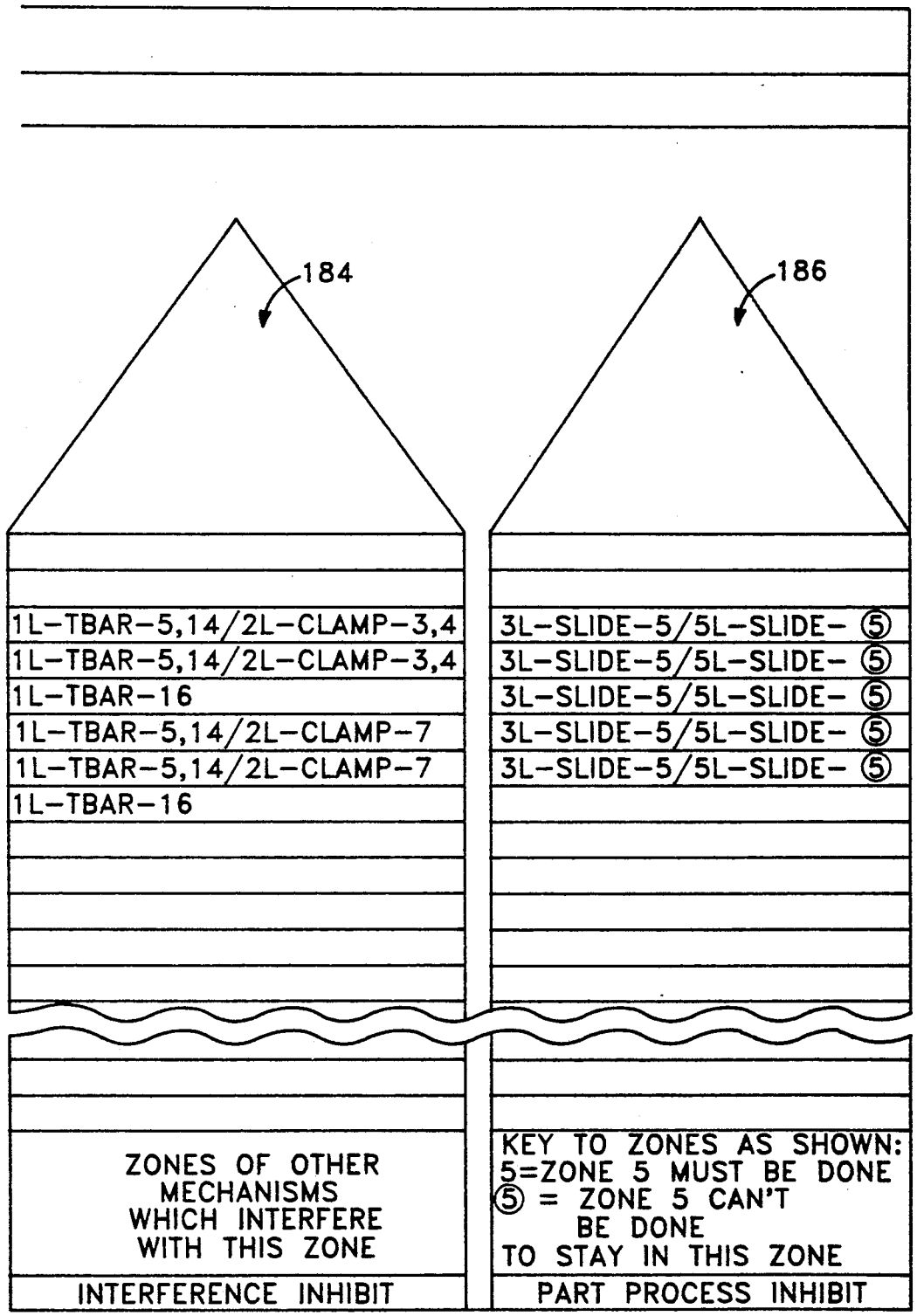

FIG. 7 illustrates a complete zone table for a ream slide mechanism in a working embodiment of the invention. The zones identified by name in the table of FIG. 7 differ from those identified in FIG. 4B in two respects. First of all, zones 6 and 7 in FIG. 4B, named ADVANCING ONTO ADVANCED AND RETURNING ONTO RETURNED have been deleted. Secondly, these zones have been replaced by an INITIALIZING zone, zone 1 in FIG. 7, and by a COASTING TO STOP zone, zone 9 in FIG. 7. The INITIALIZING zone is necessary to provide a starting point upon initialization of the mechanism and associated controller. The zone table of FIG. 7 also includes command inputs as well as physical inputs from the limit switches, a column 180 of maximum times in zone where appropriate for each zone, a column 182 of allowable next zones, and a pair of inhibit columns 184, 186 for each zone as a function of potential interference with other zones in the overall system (column 184) and the part processing record inhibit previously discussed (column 186). The table of FIG. 7 is for operation of the MECHANICAL SLIDE (70 in FIG. 2) at the ream station, which is given the station name 5L. The mechanism at transfer station is called TBAR and the transfer station is named 1L, and the CLAMP mechanism is at station named 2L. The drill station (12 in FIG. 1) is named 3L.

When INITIALIZING, all inputs are initially ignored, motion power outputs are set to zero and, after a delay of 0.1 second (column 180), the physical or limit switch inputs are tested for an image corresponding to zones 2, 5 and 8 in that order (column 182). That is, upon initialization, the physical mechanism must be either RETURNED per zone 2, ADVANCED per zone 5 or STOPPED BETWEEN the RETURNED and ADVANCED positions per zone 8. If the physical inputs from the limit switches do not correspond to any of these zones, the zone engine (FIG. 5) automatically transfers to ERROR zone 10, and a corresponding error message is indicated at display 60 as will be described in detail in connection with FIGS. 8-9. Assuming that the slide is RETURNED upon initialization, operation transfers to zone 2 and awaits receipt of an ADVANCE SLIDE command. Note that there is no maximum time (column 180) in zone 2, and that the only allowable next zones (column 182) are zone 3, which is entered upon receipt of an ADVANCE SLIDE command, and ERROR zone 10 which is entered upon any other I/O change. Upon receipt of the ADVANCE SLIDE command, operation transfers to zone 3 in which advance motion power is applied to the slide motor unless inhibited by a transfer inhibit or a part process inhibit. In interference inhibit column 184, application of advance motion power is inhibited if the transfer mechanism TBAR at transfer station 1L is in zone 5 or 14 of that mechanism (in which transfer is taking place). Manifestly, the ream slide should not be advanced onto the workpiece if transfer is in process. Likewise, application of advance motion power is inhibited if the CLAMP mechanism at station 2L is in zone 3 or 4—i.e., when the clamp mechanism would physically interfere with reaming of the workpiece. In the part process inhibit column 186, application of advance motion power is inhibited if the SLIDE mechanism at drilling station 3L has not achieved zone 5 of that mechanism (which, because it is a MECHANICAL SLIDE, corresponds to zone 5 of FIG. 7). That is, advancement of the reaming mechanism is inhibited unless the part processing record in machine RAM section 146, which is updated after each machine cycle, indicates that the drill SLIDE mechanism at drilling station 3L (12 in FIG. 1) has already been ADVANCED against the part now present at the reaming station. Likewise, application of advance motion power is inhibited if the SLIDE mechanism at station 5L, which is the reaming station, has already achieved zone 5 on this part—i.e., has already reamed its hole. The maximum time in zone 3 is one second, which is to say that if more than one second is required to leave returned limit switch 74 (FIG. 2) operation transfers to ERROR zone 10. Operation can transfer to ADVANCING BETWEEN zone 4, COATING TO STOP zone 9 or ERROR zone 10. Operation then proceeds through the various zones with maximum times in zone, allowed next zones, interference inhibits and part process inhibits as illustrated in FIG. 7. The interference inhibit and part process inhibit columns of the zone table of FIG. 7 may be completed by the system designer, or more preferably, completed by computer during a system coding process based upon information supplied by the system designer in establishing operation of other system zones.

FIG. 8 is a schematic diagram which illustrates that portion of orchestrator controller 56 (FIGS. 1 and 2) which relates to generation of error messages at display 60. Station computers 82 (FIG. 2) communicate with orchestrator 56 through communication loop 54. As noted above, details of such communication are disclosed in copending U.S. application Ser. No. 757,225 filed Jul. 19, 1985. Error message generation within orchestrator 56 is programmed as what might be termed a "pseudomechanism," which is to say that error message generation is programmed as if it were a physical mechanism, such as the mechanical slide hereinabove discussed in detail. A zone engine 170 similar to that in FIG. 6 receives the error signals from the station computers. A command interpreter 172 accesses zone tables 174, which include zone tables of the type in FIG. 7 for all stations, zones and pseudozones. From such zone tables, the error message is composed as a function of the error message signals and supplied to display 60.

Figure 9B:
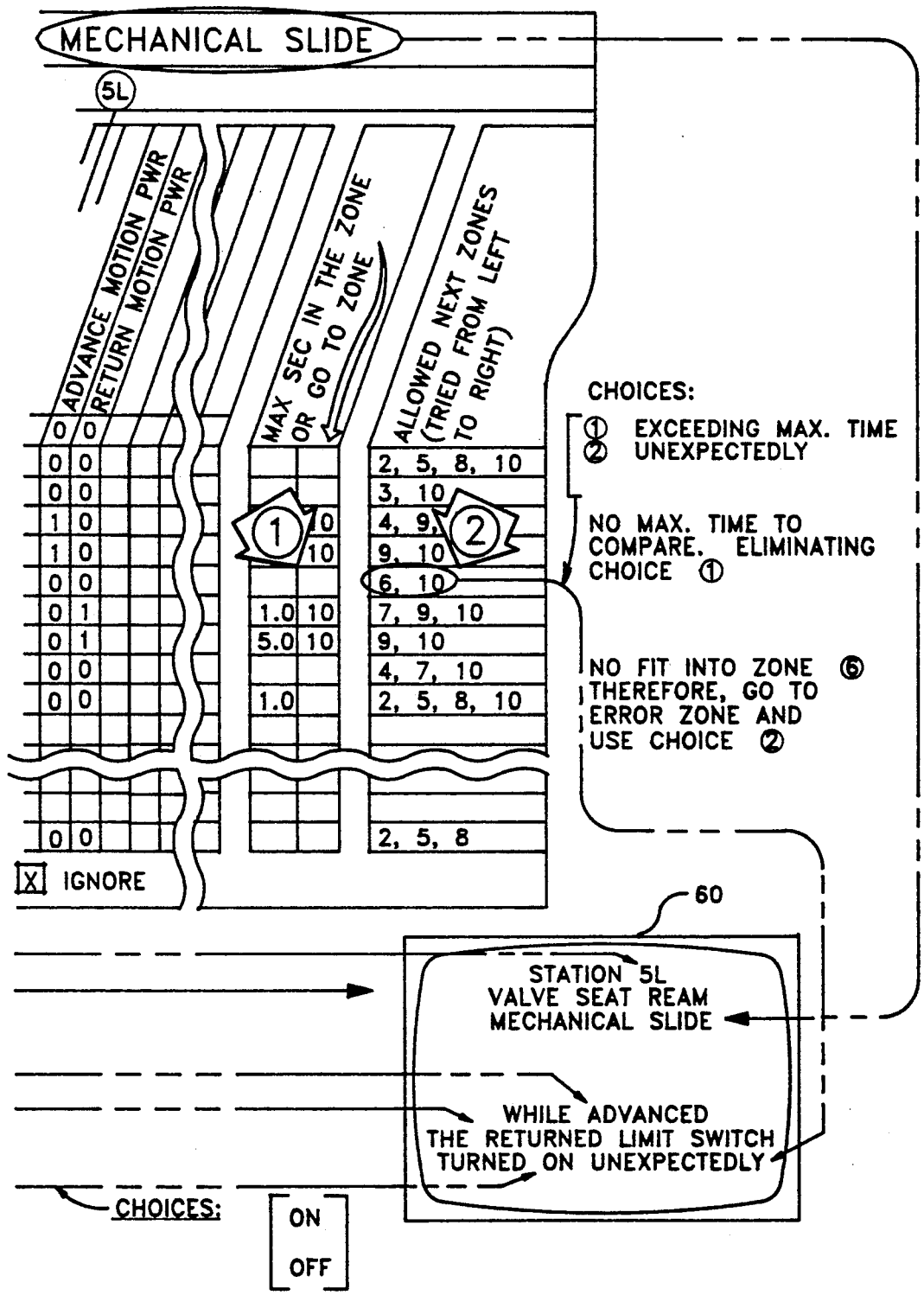

FIG. 9 illustrates error message generation for a particular type of error—i.e., one in which returned limit switch 74 turned on while MECHANICAL SLIDE mechanism 70 at reaming station 5L was in the ADVANCED zone—i.e., zone 3 in FIGS. 4A and 4B or zone 5 in FIG. 7. Through access to tables 174, command interpreter 172 (FIG. 8) automatically displays station name "STATION 5L", a verbal description of station function "VALVE SEAT REAM," and the name of the failed mechanism "MECHANICAL SLIDE." The message continues with the preprogrammed standard introductory word "WHILE" followed by the name of the zone in which the mechanism was operating prior to entry into the error zone—i.e., the zone name "ADVANCED." The message continues with the preprogrammed article "THE" followed by the name of the physical I/O which apparently failed—i.e., "RETURNED LIMIT SWITCH." The message continues with the preprogrammed word "TURNED" followed by "ON" or "OFF" depending upon the state to which the switch changed to create the error—in this case "ON". Finally, since the returned limit switch was not expected to turn on during operation in this zone, the message includes the word "UNEXPECTEDLY." Thus, the total message indicates that at "STATION 5L VALVE SEAT REAM MECHANICAL SLIDE" an error condition arose in which "WHILE ADVANCED THE RETURNED LIMIT SWITCH TURNED ON UNEXPECTEDLY."

In addition to a change in physical I/O image, an error can occur if the mechanism remains in a zone for a time greater than the corresponding maximum time-in-zone. For example, the slide may remain in RETURNING BETWEEN zone 7 for a time greater than the maximum time of five seconds. In this case, the error message at display 60 would read "STATION 5L VALVE SEAT REAM MECHANICAL SLIDE WHEN RETURNING BETWEEN EXCEEDED MAXIMUM TIME." Thus, command interpreter 172 (FIG. 8) and preprogrammed zone tables 174 together comprise an error message composer which automatically associated predefined text with error messages received from the station computers. It will be noted in particular that this feature of the invention coordinates with the use of predefined zone logic as hereinabove described since examination of the zone name, mechanism name, zone image and unexpected event effectively defines the error message. The system thus presents the diagnosis of the problem in a standard language readily understood by humans. The operator immediately identifies the fault without further thought or interpretation of logic sequences of relay contacts or the like. It will be appreciated that the error messages themselves are not preprogrammed, only individual message segments associated with specific conditions. Thus, the designer need not consider all possible combinations of errors. Indeed, for the MECHANICAL SLIDE mechanism of FIG. 9, the total number of possible error messages is equal to the number of zone names (nine) multiplied by the number of I/O names (four) multiplied by the number of possible I/O states (two) multiplied by the number of terminations ("EXCEEDING MAX TIME" or "UNEXPECTEDLY"—i.e., two). Thus, one hundred forty-four possible error messages are composable without explicit extra programming relating to each message individually.

Coding of a complete system involves a number of stages. First of all, a part process is defined as a function of operations to be performed on the workpieces. In the example of FIG. 1 hereinabove discussed in detail, five physical operations are performed—i.e., drilling, reaming, tapping, clamping and transfer. Thus, as a second step, the definitions of each station machine follows from the process definition, and in turn leads to definition of the physical mechanism or mechanisms at each location. As hereinabove noted, a mechanism is a device which provides a single motion and cannot interfere with itself. In the example discussed each station includes a single mechanism. However, there is no constraint on the number of mechanisms at a station. For example, the ream motor could be operated as a separate mechanism, and the collective clamp mechanism can be replaced by a separate clamp mechanism at each station. Regardless of the number of mechanisms in the system, implementation proceeds exactly as described herein. In addition, as noted above, that are a number of psuedomechanisms that must be defined which do not relate to a particular physical mechanism but which are needed to operate the overall system. Such pseudomechanisms may include initialization, auto cycling and/or error message generation.

Following identification of mechanisms, the system designer must define the allowable or valid zones for each mechanism along lines previously discussed in connection with FIGS. 4A and 4B, and also define mechanism-to-mechanism interferences among the various mechanisms within a single station and among the various stations. For example, none of the slides in the system of FIG. 1 can be advanced while the transfer mechanism 50 is operating or until the clamp bar 44 is in the clamped position. Similarly, the clamp bar 44 cannot be brought into clamped position while the transfer mechanism 50 is operating, and conversely the transfer mechanism cannot be operated until the clamp bar is rotated out of clamping position. These and other mechanism-to-mechanism interferences are defined by the system designer and placed either directly or, more preferably, by computer into the complete zone table for each system mechanism as illustrated in FIG. 7. Likewise, part process inhibit data is compiled by the system designer and placed in the zone table for each operating mechanism, either directly or by computer, as illustrated in and hereinabove discussed in connection with FIG. 7.

It will be noted that, although the system coding process described above can be a time consuming operation, control coding follows inherently and logically from overall system design and requirements. Furthermore, the system design process is, in essence, a constraint design process rather than an enablement design process. Two benefits result. First, since system operation is constraint limited, the system is permitted to operate to its maximum capacity without requiring the system designer actually to determine maximum system capacity. Secondly, the system designer is not required to anticipate all possible situations of system operation.

An appendix to this application includes a complete software listing for operation of the exemplary mechanical slide mechanism hereinabove discussed in detail, for implementing pushbutton logic 88 (FIG. 2) as described and for generation of the error messages as illustrated in FIG. 9.

Zone Logic Error Analysis

```
/* Build the error input states character string */ zeb_berd(erl,erd)
 struct stolist *erl;
 struct errordat *erd;
(
   unsigned int i, j;
   char *errstate;
   char *zeb_gers();
   char errstr[129];
   char zon_gioc();
   char *mio_iofn();
   struct miodata *iblk;
   struct symbolb *slf_bsb();
   struct mechanism *mcs_fmb();
   struct mechanism *ermech = mcs_fmb(erd->estatid,erd->emechnum);
   strcpy(errstr," ");
   if (erd->cindbyte == 0xFD) errstr[1] = zon_gioc("ON");
   if (erd->chanbyte == 0xFE) errstr[2] = zon_gioc("ON");
   for (i = 3; i <= ermech->milist->list_count; i++)
   ( iblk = ermech->milist->list[i];
      errstate = zeb_gers(erd,iblk->isbyte,iblk->bmask);
      errstr[i] = zon_gioc(errstate);
      slf_bsb(erl,erl,errstate,mio_iofn(iblk),'P','M');
   )
   errstr[i] = '\0';
   slf_bsb(erl,erl,"%errorinstates",errstr,'P','M');
)
/* Get the first expected exit from the logic module */ zeb_exzo(erd)
 struct errordat *erd;
(
  char sbuff[81];
   unsigned int extype;
   unsigned int mci_gze();
   unsigned int zxaddr = mci_gze(erd->estatid,erd->emechnum,erd->chanzone);
   erd->exitzone = 0;
for (;;zxaddr += 4)
   ( mci_rmds(erd->estatid,0xF,zxaddr,4,sbuff);
      if ((extype = extractx(sbuff,17,2)) == 0) return;
      if (extype == 5) break;
   )
   erd->exitzone = extractx(sbuff,19,2);
   erd->exitbyte = extractx(sbuff,21,2);
   erd->exitbit = extractx(sbuff,23,2);
   erd->exitselb = mci_gisb(erd->estatid,erd->emechnum,
                         erd->exitzone,erd->exitbyte);
)
/* Fill the storage list with symbols for a zone and input */
```

Zone Logic Error Analysis

```
zeb_fill(erl,erd,fzone,fselb,fbit,app)
 struct stolist *erl;
 struct errordat *erd;
 int fzone;
 int fselb;
 int fbit;
 char *app;
{
  struct miodata *vmio;
  char *iostate;
  char *mls_fzb();
  char *zeb_gers();
  char *togonoff();
  struct symbolb *slf_bsb();
  struct miodata *mls_fiob();
  if (fzone == 0) return;
  mls_fzb(erl,erd->estatid,erd->emechnum,fzone,app);
  vmio = mls_fiob(erl,erd->estatid,erd->emechnum,fselb,fbit,app);
  iostate = zeb_gers(erd,fselb,vmio->bmask);
  slf_bsb(erl,erl,"%errstate",iostate,'A','P',app);
  slf_bsb(erl,erl,"%expstate",togonoff(iostate),'A','P',app);
}
/* Get an error state from the raw data given a selector byte and mask */ char *zeb_gers(erd,sbyte,mask)
 struct errordat *erd;
 unsigned int sbyte;
 unsigned int mask;
{
  unsigned int i;
  for (i = 1; i <= erd->totsel; i++)
   (if (erd->selbys[i] == sbyte)
     (if (erd->errbys[i] & mask) return("ON");
       return("OFF");
     }
   }
   return("IGN");
}
/* Journal the error from the error listing */ zeb_jour(erl)
 struct stolist *erl;
{
  char *slf_gsbd();
  jcs_rjtl(slf_gsbd(erl,"%errortype"),erl);
}
/* Gather all the error data into a storage list of symbols */ zeb_list(sblock,erl,erd)
 struct screen *sblock;
 struct stolist *erl;
 struct errordat *erd;
 char *zeb_type(),*slf_rdss(),*etype;
 char *tline,tbuff[256],*etmplt,*sds_gstv();
 struct symbolb *slf_bsb();
 struct mechanism *mcs_fbsl();
 etype = zeb_type(erl,erd);
 slf_bsb(erl,erl,"%errortype",etype,'P','P');
 zeb_time(erl);
 zeb_raw(erl,erd);
 mcs_fbsl(erl,erd->estatid,erd->emechnum);
 zeb_mess(sblock,erl);
 zeb_fill(erl,erd,erd->chanzone,erd->chanselb,erd->chanbit,"from");
 zeb_fill(erl,erd,erd->cindzone,erd->cindselb,erd->cindbit,"to");
```

Zone Logic Error Analysis

```
  zeb_fill(erl,erd,erd->exitzone,erd->exitselb,erd->exitbit,"exit");
  zeb_berd(erl,erd);
  etmplt = sds_gstv(etype,"display","no error template");
  tline = slf_rdss(erl,etmplt,tbuff,FALSE);
  slf_bsb(erl,erl,"%edisplay",tline,'P','M');
  zeb_jour(erl);
}
/* Fill in the error messages from the error listing */ zeb_mess(sblock,erl)
 struct screen *sblock;
 struct stolist *erl;
{
  char *slf_gsbrv();
  ses_resrv("MACHINE ERRORS","%errortype",slf_gsbrv(erl,"%errortype"));
  ses_resrv("MACHINE ERRORS","%station",slf_gsbrv(erl,"%station"));
  ses_resrv("MACHINE ERRORS","%stationid",slf_gsbrv(erl,"%stationid"));
  zes_ensy(sblock,"%mechanism",slf_gsbrv(erl,"%mechanism"));
  ses_veg(sblock,"error data",erl);
}
/* Write the raw (logic module) error data to a storage list */ zeb_rav(erl,erd)
 struct stolist *erl;
 struct errordat *erd;
{
  struct symbolb *slf_bsb();
  struct symbolb *slf_bsbi();
  struct symbolb *slf_bsbf();
  slf_bsbi(erl,erl,"%estatid", erd->estatid, 'P',"%04x");
  slf_bsbi(erl,erl,"%emechnum",erd->emechnum,'P',"%d");
  slf_bsbi(erl,erl,"%chanzone",erd->chanzone,'P',"%d");
  slf_bsbi(erl,erl,"%chanbyte",erd->chanbyte,'P',"%02x");
  slf_bsbi(erl,erl,"%chanselb",erd->chanselb,'P',"%02x");
  slf_bsbi(erl,erl,"%chanbit", erd->chanbit, 'P',"%02x");
  slf_bsbi(erl,erl,"%cindzone",erd->cindzone,'P',"%d");
  slf_bsbi(erl,erl,"%cindbyte",erd->cindbyte,'P',"%02x");
  slf_bsbi(erl,erl,"%cindselb",erd->cindselb,'P',"%02x");
  slf_bsbi(erl,erl,"%cindbit", erd->cindbit, 'P',"%02x");
  slf_bsbi(erl,erl,"%exitzone",erd->exitzone,'P',"%d");
  slf_bsbi(erl,erl,"%exitbyte",erd->exitbyte,'P',"%02x");
  slf_bsbi(erl,erl,"%exitselb",erd->exitselb,'P',"%02x");
  slf_bsbi(erl,erl,"%exitbit", erd->exitbit, 'P',"%02x");
  slf_bsbi(erl,erl,"%totsel",  erd->totsel,  'P',"%d");
  slf_bsbi(erl,erl,"%ravztime",erd->zonetime,'P',"%04x");
  slf_bsbf(erl,erl,"%zonetime",(float)erd->zonetime/100,'P',"%.2f");
}
/* Return a pointer for error storage */ struct stolist *zeb_scad()
{
  int errsize;
  int max;
  unsigned int i;
  struct stolist *slf_ipsl();
  struct stolist *sds_gsla();
  struct stolist *macerrs = sds_gsla("MACHINE ERRORS");
  errsize = sds_gsdi("SINGLE ERROR SIZE",3000,"%d");
  max = macerrs->allocated - sizeof(struct stolist) - (2 * sizeof(char*));
  if (errsize > max) errsize = max;
  max = errsize + sizeof(struct stolist) + sizeof(char*);
  if (slf_cslm(macerrs) >= max)
      macerrs->list[0] = slf_ipsl(macerrs,macerrs,errsize);
  else
   {for (i = 1; i < macerrs->list_count; i++)
      if (macerrs->list[i] == macerrs->list[0]) break;
```

Zone Logic Error Analysis

```c
    i = vrapint(++i,1,macerrs->list_count);
    macerrs->list[0] = macerrs->list[i];
  )
  slf_csl(macerrs->list[0]);
  return(macerrs->list[0]);
)
/* Scan the machine for an error */ char *zeb_scan(sblock)
 struct screen *sblock;
(
  struct stolist *slf_asls();
  char mbuff[500];
  struct mechanism *mblock,*mcs_fbsl();
  struct stolist *mlist = slf_asls(mbuff,500);
  struct errordat ed;
  struct screen *overlay;
  struct screen *ses_mesl();
  struct stolist *zeb_scad();
  if(isoverly()) return(NULL);
  if (mci_gera(&ed) == FALSE) return(NULL);
  cif_dbse(ed.estatid,ed.emechnum);
  if((mblock = mcs_fbsl(mlist,ed.estatid,ed.emechnum)) == NULL) (
   mci_cler(ed.estatid);
   return(NULL);
  )
  overlay = ses_mesl(sblock,"error monitor","error data",mlist);
  mci_gerd(&ed);
  zeb_exzo(&ed);
  mci_cler(ed.estatid);
  zeb_list(overlay,zeb_scad(),&ed);
  reoverly();
  sgn_clr();
  return("error rewrite");
)
/* Get the time and date for this error collection */ zeb_time(erl)
 struct stolist *erl;
(
  char time[20];
  char date[20];
  struct symbolb *slf_bsb();
  gettime(time);
  getdate(date);
  slf_bsb(erl,erl,"%etime",time,'P','M');
  slf_bsb(erl,erl,"%edate",date,'P','M');
)
/* Get an error type string */ char *zeb_type(erl,erd)
 struct stolist *erl;
 struct errordat *erd;
(
  char *zeb_cinl();
  if (erd->emechnum == 0)      return("no errors");
  if (erd->chanbyte == 0xFE)
    (if (erd->cindbyte == 0)
      ( if (erd->exitzone == 0) return("no exit");
        else                    return("late");
      )
     else                       return("late no zone fit");
   )
  if (erd->cindbyte == 0x00)   return("unexpected");
  if (erd->cindbyte == 0xFD)   return("early");
                               return("no zone fit");
```

Zone Logic Error Analysis

```
)
/* Clear the error storage area and the error messages */ char *zes_cerr(sblock,sreturn)
 struct screen *sblock;
 char *sreturn;
{
  struct stolist *sds_gsla();
  struct stolist *macerrs = sds_gsla("MACHINE ERRORS");
  slf_csl(macerrs);
  ses_resrv("MACHINE ERRORS","%errorwatch","NO errors in memory");
  ses_resrv("MACHINE ERRORS","%errortype","");
  ses_resrv("MACHINE ERRORS","%station","");
  ses_resrv("MACHINE ERRORS","%stationid","");
  zes_ensy(sblock,"%mechanism","");
  return("error rewrite");
}
/* Set a machine error symbol and rewrite the machine error entities */ zes_ensy(sblock,esym,emsg)
 struct screen *sblock;
 char *esym;
 char *emsg;
{
  ses_resrv("MACHINE ERRORS",esym,emsg);
  if (sblock != NULL) ses_wekg(sblock,"machine errors");
}
/* Setup keyword return handlers for ZES zone error system */ zes_skrh()
{
  char *zes_cerr();
  ses_akra("ERROR CLEAR",zes_cerr);
}
/* set up storage area for error lists */ int zes_szes()
{
  char *pnull = NULL;
  char *zeb_scan();
  char *zes_cerr();
  char *sds_gsds();
  struct stolist *sds_aslsb();
  struct stolist *me = sds_aslsb("MACHINE ERRORS",
                  sds_gsdi("MACHINE ERRORS SIZE",8000,"%d"));
  if (me == NULL) return(procerr("memory alloc failure","MACHINE ERRORS"));
  zes_cerr(pnull,pnull);
  ses_abti("zeb_scan",zeb_scan,sds_gsds("MACHINE ERROR SYSTEM","ON"));
  return(TRUE);
}
```

MECHANICAL SLIDE MEMORY DATA

```
                .cksm start       0116 015F    .indx M1E1
                .orgn $MEC1       0118 0168    .indx M1O2
0100 0000       .indx  M1CD       011A 016B    .indx M1I2
0102 0000       .indx $M1MD       011C 0173    .indx M1E2
0104 0000       .indx  M1ID       011E 017C    .indx M1O3
0106 0000       .indx $M1LD       0120 017F    .indx M1I3
0108 0000       .byte 0000        0122 0187    .indx M1E3
010A 0214       .indx  M1CK       0124 0190    .indx M1O4
010C 0000       .indx $M1ZC       0126 0193    .indx M1I4
010E 0000       .byte 0000        0128 019B    .indx M1E4
0110 000A       .byte 000A        012A 01A4    .indx M1O5
0112 0154       .indx  M1O1       012C 01A7    .indx M1I5
0114 0157       .indx  M1I1       012E 01AF    .indx M1E5
```

MECHANICAL SLIDE MEMORY DATA

```
0130 01B8            .indx M106
0132 01BB            .indx M1I6
0134 01C3            .indx M1E6
0136 01CC            .indx M107
0138 01CF            .indx M1I7
013A 01D7            .indx M1E7
013C 01E0            .indx M108
013E 01E3            .indx M1I8
0140 01EB            .indx M1E8
0142 01F4            .indx M109
0144 01F7            .indx M1I9
0146 01FF            .indx M1E9
0148 0208            .indx M1010
014A 020B            .indx M1I10
014C 0213            .indx M1E10

014E  01   M10S:    .byte 01
014F  00            .byte 00

0150  01   M1IS:    .byte 01
0151 0000           .byte 000000

0154 014E  M101:    .indx M10S
0156  00            .byte 00
0157 0150  M1I1:    .indx M1IS
0159 0000           .byte 0000
015B FFFF           .byte FFFF
015D C040           .byte C040
015F 0504  M1E1:    .byte 0504FE00
0163 030A           .byte 030AFFFF
0167  00            .byte 00

0168 014E  M102:    .indx M10S
016A  00            .byte 00
016B 0150  M1I2:    .indx M1IS
016D 0000           .byte 0000
016F FFFF           .byte FFFF
0171 C000           .byte C000
0173 0505  M1E2:    .byte 0505FE00
0177 030A           .byte 030AFFFF
017B  00            .byte 00

017C 014E  M103:    .indx M10S
017E  00            .byte 00
017F 0150  M1I3:    .indx M1IS
0181 0000           .byte 0000
0183 FFFF           .byte FFFF
0185 C080           .byte C080
0187 0509  M1E3:    .byte 0509FE00
018B 030A           .byte 030AFFFF
018F  00            .byte 00
0190 014E  M104:    .indx M10S
0192  80            .byte 80
0193 0150  M1I4:    .indx M1IS
0195 0000           .byte 0000
0197 FFFF           .byte FFFF
0199 C040           .byte C040
019B 0505  M1E4:    .byte 05050140
019F 030A           .byte 030AFFFF
01A3  00            .byte 00

01A4 014E  M105:    .indx M10S
01A6  80            .byte 80
01A7 0150  M1I5:    .indx M1IS
01A9 0000           .byte 0000
01AB FFFF           .byte FFFF
01AD C000           .byte C000
01AF 0506  M1E5:    .byte 05060180
01B3 030A           .byte 030AFFFF
01B7  00            .byte 00

01B8 014E  M106:    .indx M10S
01BA  80            .byte 80
01BB 0150  M1I6:    .indx M1IS
01BD 0000           .byte 0000
01BF FFFF           .byte FFFF
01C1 C080           .byte C080
01C3 0503  M1E6:    .byte 0503FE00
01C7 030A           .byte 030AFFFF
01CB  00            .byte 00

01CC 014E  M107:    .indx M10S
01CE  40            .byte 40
01CF 0150  M1I7:    .indx M1IS
01D1 0000           .byte 0000
01D3 FFFF           .byte FFFF
01D5 C040           .byte C040
01D7 0501  M1E7:    .byte 0501FE00
01DB 030A           .byte 030AFFFF
01DF  00            .byte 00

01E0 014E  M108:    .indx M10S
01E2  40            .byte 40
01E3 0150  M1I8:    .indx M1IS
01E5 0000           .byte 0000
01E7 FFFF           .byte FFFF
01E9 C000           .byte C000
01EB 0507  M1E8:    .byte 05070140
01EF 030A           .byte 030AFFFF
01F3  00            .byte 00

01F4 014E  M109:    .indx M10S
01F6  40            .byte 40
01F7 0150  M1I9:    .indx M1IS
01F9 0000           .byte 0000
01FB FFFF           .byte FFFF
01FD C080           .byte C080
01FF 0508  M1E9:    .byte 05080180
0203 030A           .byte 030AFFFF
0207  00            .byte 00

0208 014E  M1010:   .indx M10S
020A  00            .byte 00
020B 0150  M1I10:   .indx M1IS
020D 0000           .byte 0000
020F FFFF           .byte FFFF
0211 0000           .byte 0000
0213  00   M1E10:   .byte 00

0214 50D9  M1CK:    .cksm write
                    smeclend:
```

MECHANICAL SLIDE DOWNLOAD FILE

```
KNRN 3F0005010023000000000000000000002140000000000A01540157015F0168016B0173017C017F01
KNRN 3F000501232387019001930198O1A401A701AF01B801BB01C301CC01CF01D701E001E301EB01F401F7
KNRN 3F000501462301FF0208020B02130100010000000014E0001500000FFFFC0400504FE00030AFFFFC0001
KNRN 3F00050169234E0001500000FFFFC0000505FE00030AFFFF00014E0001500000FFFFC0800509FE0003
KNRN 3F00050180C230AFFFF00014E8001500000FFFFC04005050140030AFFFF00014E8001500000FFFFC000
KNRN 3F000501AF2305060180030AFFFF00014E8001500000FFFFC0800503FE00030AFFFF00014E40015000
KNRN 3F000501D22300FFFFC0400501FE00030AFFFF00014E4001500000FFFFC00005070140030AFFFF0001
KNRN 3F000501F5214E4001500000FFFFC08005080180030AFFFF00014E0001500000CFFFF0000050D9
```

```
;***   "OR" PUSHBUTTON ACTIONS INTO WORK AREA FOR 1 MECH ***185+IN(187)+PB(43)
;FUNCTION:  "OR" PUSHBUTTON ACTIONS INTO WORK AREA FOR 1 MECH
;ENTRY:     MECH=MECH NUMBER
;           MHPTRH/L=PHYSICAL START OF MECH HEADER
;           ZNUMB=ZONE# OF CURRENT MECH
;EXIT:      OUTPUT WORK AREA CONTAINS ACTIVE PUSHBUTTONS TO FLASH
;
    ;FIND INPUT MATCH LIST AND INPUT SELECTOR LIST
PBACT:  MOV     A,ZNUMB             ;1 ZNUMB=ZONE# OF CURRENT MECH
        LCALL   CTABLE              ;98 DPTR=PHYSICAL START OF INPUT MATCH LIST
        XSUM    (DPL,#06H,IMPTRL)   ;3
        XSUMC   (DPH,#00H,IMPTRH)   ;3 IMPTRH/L=ADDR OF INPUT COMPARE MASK 1
        LCALL   RDADDR              ;47 EXIT DPTR=PHYSICAL START OF SELECTOR LIST
        JZ      PBX                 ;2 IF NO COMPARE LIST, EXIT
        LCALL   RDRAM               ;17 ACC=NUMBER OF ENTRIES IN LIST
        JZ      PBX                 ;2 IF NO ENTRIES EXIT
        MOV     COUNT,A             ;1 SET LOOP COUNT
        INC     DPTR                ;2 DPTR=PHYSICAL ADDR OF INPUT SELECTION 1
        MOV     SPTRH,DPH           ;2
        MOV     SPTRL,DPL           ;2 SPTRH/L=PHYSICAL ADDR OF INPUT SELECTION 1
    ;READ NEXT ENTRY FROM INPUT SELECT LIST
PBMECH: LCALL   RDISEL              ;73 SELECT=INPUT SELECTOR
                                    ;IF TYPE0, PBMASK & TRMASK READ
    ;READ NEXT MASK FROM INPUT COMPARE LIST
        MOV     DPH,IMPTRH          ;2
        MOV     DPL,IMPTRL          ;2
        LCALL   RDRAM               ;17
        MOV     MASK,A              ;1
        INC     DPTR                ;2
        INC     DPTR                ;2
        MOV     IMPTRL,DPL          ;2
        MOV     IMPTRH,DPH          ;2
    ;CHECK FOR TYPE 0 PUSHBUTTON (PHYSICAL PUSHBUTTON)
        JNB     TYPE0,PBZXIT        ;2 IF NOT TYPE 0, GOTO PBZXIT
    ;APPLY PB MASK
        MOV     A,PBMASK            ;1
        ANL     A,MASK              ;1 ACC=PB MASK "AND" ACTIVE MASK
        MOV     MASK,A              ;1 MASK=ACTIVE PUSHBUTTONS
    ;"OR" PUSHBUTTONS INTO FLASH WORK AREA
        XSUM    (SELECT,#80H,DPL)   ;3
        MOV     DPH,#PAGE4          ;2
        LCALL   RDRAM               ;17
        ORL     A,MASK              ;1
        LCALL   WRRAM               ;17
    ;REPEAT FOR EACH ITEM IN ZONE COMPARE LIST
PBZXIT: DJNZ    COUNT,PBMECH        ;2
PBX:    RET                         ;2 RETURN FROM SUBROUTINE
```

MECHANICAL SLIDE ZONE L IC SOURCE

```
zone z.1 returned
  maximum 1.0
  input off advanced.limit.switch
  input on returned.limit.switch
  output off advance.motion.pwr
  output off return.motion.pwr
  expect z.4 t;max.time
  error z.10 zone z.2 stopped between
  maximum 1.0
  input off advanced.limit.switch
  input off returned.limit.switch
  output off advance.motion.pwr
  output off return.motion.pwr
  expect z.5 t;max.time
  error z.10 zone z.3 advanced
  maximum 1.0
  input on advanced.limit.switch
  input off returned.limit.switch
  output off advance.motion.pwr
  output off return.motion.pwr
  expect z.9 t;max.time
  error z.10 zone z.4 advancing from returned
  input off advanced.limit.switch
  input on returned.limit.switch
  output on advance.motion.pwr
  output off return.motion.pwr
  expect z.5 returned.limit.switch
  error z.10 zone z.5 advancing between
  input off advanced.limit.switch
  input off returned.limit.switch
  output on advance.motion.pwr
  output off return.motion.pwr
  expect z.6 advanced.limit.switch
  error z.10 zone z.6 advancing onto advanced
  maximum 1.0
  input on advanced.limit.switch
  input off returned.limit.switch
  output on advance.motion.pwr
  output off return.motion.pwr
  expect z.3 t;max.time
  error z.10 zone z.7 returning onto returned
  maximum 1.0
  input off advanced.limit.switch
  input on returned.limit.switch
  output off advance.motion.pwr
  output on return.motion.pwr
  expect z.1 t;max.time
  error z.10 zone z.8 returning between
  maximum 1.0
  input off advanced.limit.switch
  input off returned.limit.switch
  output off advance.motion.pwr
  output on return.motion.pwr
  expect z.7 returned.limit.switch
  error z.10 zone z.9 returning from advanced
  maximum 1.0
  input on advanced.limit.switch
  input off returned.limit.switch
  output off advance.motion.pwr
  output on return.motion.pwr
  expect z.8 advanced.limit.switch
  error z.10 zone z.10 error
  input ign advanced.limit.switch
  input ign returned.limit.switch
  output off advance.motion.pwr
  output off return.motion.pwr input 1 advanced.limit.switch na input 2 returned.limit.switch na output 1 na advance.motion.pwr output 2 na return.motion.pwr
```

The invention claimed is:

1. A machine control system which comprises, in combination, at least one mechanism including means for actuating said mechanism, means for sensing mechanism conditions, and control means responsive to a predefined input from said condition-sensing means for providing a predefined output to said actuating means, characterized in that said control means comprises:
   a present zone memory means for storing a present zone of a mechanism of said machine;
   an input/output image memory means for storing a table of input/output images associated with said present zone of said mechanism;
   an allowed next zones memory means for storing at least one allowed next zone associated with said present zone of said mechanism, at least one of said zones having a plurality of allowed next zones;
   means for comparing a new input/output image to an input/output image of said plurality of allowed next zones, wherein if said next zone corresponding to said new input/output image does not correspond to one of said plurality of allowed next zones, an error in processing of said machine exists, and
   a part processing inhibit table indicative of conditions wherein an operation on a workpiece at said mechanism should be inhibited because said workpiece is not properly prepared for said operation.

2. A machine control system which comprises, in combination, at least one mechanism including means for actuating said mechanism, means for sensing mechanism conditions, and control means responsive to a predefined input from said condition-sensing means for providing a predefined output to said actuating means, characterized in that said control means comprises:
   a present zone memory means for storing a present zone of a mechanism of said machine;
   an input/output image memory means for storing a table of input/output images associated with said present zone of said mechanism;
   an allowed next zones memory means for storing at least one allowed next zone associated with said present zone of said mechanism, at least one of said zones having a plurality of allowed next zones;
   means for comparing a new input/output image to an input/output image of said plurality of allowed next zones, wherein if said next zone corresponding to said new input/output image does not correspond to one of said plurality of allowed next zones, an error in processing of said machine exists, and
   an interference inhibit memory means for storing an interference inhibit table describing at least one zone of one mechanism which inhibits at least one zone of another mechanism.

3. The machine control system of claim 2 further comprising a means for identifying the current zone of the one mechanism, and using said interference table to determine the zones of the other mechanism which are inhibited.

4. A method of monitoring the operating of a machine which comprises in combination at least one mechanism including means for actuating said mechanism, and means for sensing mechanism conditions, and control means including memory means, said control means responsive to a predefined input from said condition-sensing means for providing a predefined output to said actuating means, said method comprising the steps of:
   storing a machine program controlled of at least one mechanism program representing sequences of operation defined by predetermined images of input and output signals stored in a table,
   monitoring the actual input/output signals, and
   comparing the image of actual input/output signals with one of the stored means, characterized by:
   a zone logic method in which each said input/output image is indicative of a zone of said mechanism and each zone having associated therewith a list of corresponding allowed next zones, with at least one of said zones having a plurality of allowed next zones,
   moving between zones by determining to leave the present zone and by selecting the next zone from among the next allowed zones
   accommodating interactions between mechanisms by having the current zone of one mechanism prevent the occupation of a predetermined zone of another mechanism, and
   setting the outputs as prescribed by said selected allowed next zone.

5. A method of monitoring the operating of a machine which comprises in combination at least one mechanism including means for actuating said mechanism, and means for sensing mechanism conditions, and diagnostic means including memory means, said diagnostic means responsive to a predefined input from said condition-sensing means for providing a predefined output to said actuating means, said method comprising the steps of:
   storing a machine program comprised of at least one mechanism program representing sequences of operation defined by predetermined images of input and output signals stored in a table,
   monitoring the actual input/output signals, and
   comparing the image of actual input/output signals with one of the stored images, characterized by:
   a zone logic method in which each said input/output image is indicative of a zone of said mechanism and each zone having associated therewith a list of corresponding allowed next zones, with at least one of said zones having a plurality of allowed next zones,
   moving between zones by determining to leave the present zone and by selecting the next zone from among the next allowed zones, and
   using said zone logic method to monitor the input/output conditions of said mechanism without setting outputs, which outputs are set by a control method other than said zone logic method.

6. The method set forth in claim 5 further characterized by:
   accommodating interactions between mechanisms and outputs by having the current zone of one mechanism determine the actuation of a predetermined output.

7. The method set forth in claims 4 or 5 further characterized by:
   said table containing at least one error zone, indicating an error condition when, after determining to depart the present zone, no next zone can be selected, and entering said error zone.

8. The method set forth in claim 7 further characterized by:

generating a plain language text error message.

9. The method set forth in claim 8 wherein the generating step is further characterized by:

storing a unique zone name for each zone of said mechanism, storing a unique input/output name for each input/output, providing at least one template containing fixed words and blank spaces, and upon detecting an error, selecting zone and input/output names for insertion into the blanks of the appropriate template to generate the message using data stored upon detection of the error.

10. The method set forth claim 8 further characterized by:

saving the actual input/output image when leaving a zone, and using said image for selecting a next zone and, if an error is detected, for generating the error message.

11. The method set forth in claim 7 further characterized by:

providing the error signal as an indication of the input/output conditions of said mechanism upon detection of an error.

12. The method set forth in claim 6 further characterized by:

displaying an error message indicative of an error condition.

13. The method set forth in claims 4 or 5 characterized by:

determining departure from an existing zone by a change in actual input/output image for the mechanism.

14. The method set forth in claims 4 or 5 characterized by:

determining departure from an existing zone by a mismatch of the actual input/output image and the current zone input/output image.

15. The method set forth in claims 4 or 5 characterized by:

selecting the next zone from the list of allowed next zones by determining the input/output causing the departure and provided the actual input image matches that of said selected next zone.

16. The method set forth in claims 4 or 5 characterized by:

selecting the next zone from the list of allowed next zones by comparing the actual input image with that of each allowed next zone in turn until a match is obtained.

17. The method set forth in claims 4 or 5 further characterized by:

monitoring the actual time in the present zone of the mechanism and comparing said time to a predetermined time associated with said particular zone.

18. The method set forth in claim 17 characterized by:

exiting the present zone when the actual time exceeds a predetermined maximum time.

19. The method set forth in claim 18 characterized by:

moving directly to the error zone and indicating an error.

20. The method set forth in claim 17 characterized by:

on leaving the zone, comparing the actual time in the zone to a predetermined minimum time, and, if less than the predetermined minimum, indicating an error.

21. The method set forth in claims 4 or 5 further characterized by:

recording an identifier of each zone that is departed and the actual time spent in that zone.

22. The method set forth in claims 4 or 5 further characterized by:

recording the occurrence of each error in a journal.

23. The method set forth in claims 4 or 5 further characterized by:

storing the condition of a part in a part process record, and using said stored condition to inhibit at least one zone of said mechanism.

24. The method set forth in claims 4 or 5 further characterized by:

indicating an error condition when, after determining to depart the present zone, no next zone can be selected.

25. The method of claim 24 further comprising the steps of storing a table containing a list of zone names, input/output names, input/output images for each zone and allowed zones for each said zone, storing in a memory a plurality of error designations, formulating an error message from said table and memory indicative of said error condition, and generating the error message from the names of the last valid zone and the input/output names that caused the input/output image to not match the last valid zone or any of the allowed next zones.

26. A system for monitoring the operating of a machine which comprises in combination at least one mechanism including means for actuating said mechanism, means for sensing mechanism conditions, and control means including memory means, said control means responsive to a predefined input from said condition-sensing means for providing a predefined output to said actuating means, said means comprising:

a stored machine program comprised of at least one mechanism program representing sequences of operation defined by predetermined images of input and output signals stored in a table, means for monitoring the actual input/output signals, and means for comparing the image of actual input/output signals with one of the stored images, characterized by:

zone logic means in which each said input/output image is indicative of a zone of said mechanism and each zone having associated therewith a list of corresponding allowed next zones, with at least one of said zones having a plurality of allowed next zones, means for moving between zones by determining to leave the present zone and by selecting the next zone from among the next allowed zones means for accommodating interactions between mechanisms by having the current zone of one mechanism prevent the occupation of a predetermined zone of another mechanism, and means for setting the outputs as prescribed by said selected allowed next zone.

27. A system for monitoring the operating of a machine which comprises in combination at least one mechanism including means for actuating said mechanism, means for sensing mechanism conditions, and diagnostic means including memory means, said diagnostic means responsive to a predefined input from said condition-sensing means for providing a predefined output to said actuating means, said means comprising:
a stored machine program comprised of at least one mechanism program representing sequences of operation defined by predetermined images of input and output signals stored in a table,
means for monitoring the actual input/output signals, and
means for comparing the image of actual input/output signals with one of the stored images, characterized by:
zone logic means in which each said input/output image is indicative of a zone of said mechanism and each zone having associated therewith a list of corresponding allowed next zones, with at least one of said zones having a plurality of allowed next zones,
means for moving between zones by determining to leave the present zone and by selecting the next zone from among the next allowed zones, and
means for using said zone logic means to monitor the input/output conditions of said mechanism without setting outputs, which outputs are set by a control method other than said zone logic method.

28. The system set forth in claims 26 or 27 further characterized by:
said table containing at least one error zone,
means for indicating an error condition when, after determining to depart the present zone, no next zone can be selected, and
means for entering said error zone.

29. The system set forth in claim 28 further characterized by:
means for generating a plain language text error message.

30. The system set forth in claim 29 wherein the means for generating is further characterized by:
means for storing a unique zone name for each zone of said mechanism,
means for storing a unique input/output name for each input/output,
means for providing at least one template containing fixed words and blank spaces, and
means for selecting zone and input/output names for insertion into the blanks of the appropriate template to generate the message using data stored upon detection of the error.

31. The system set forth in claims 26 or 27 characterized by:
means for determining departure from an existing zone by a change in actual input/output image for the mechanism.

32. The system set forth in claims 26 or 27 characterized by:
means for determining departure from an existing zone by a mismatch of the actual input/output image and the current zone input/output image.

33. The system set forth in claims 26 or 27 characterized by:
means for selecting the next zone from the list of allowed next zones by determining the input/output causing the departure and provided the actual input image matches that of said selected next zone.

34. The system set forth in claims 26 or 27 characterized by:
means for selecting the next zone from the list of allowed next zones by comparing the actual input image with that of each allowed next zone in turn until a match is obtained.

35. The system set forth in claims 26 or 27 further characterized by:
means for monitoring the actual time in the present zone of the mechanism and comparing said time to a predetermined time associated with said particular zone.

36. The system set forth in claims 26 or 27 further characterized by:
means for recording an identifier of each zone that is departed and the actual time spent in that zone.

37. The system set forth in claims 26 or 27 further characterized by:
means for recording the occurrence of each error in a journal.

38. The system set forth in claims 26 or 27 further characterized by:
means for storing the condition of a part in a part process record, and
using said stored condition to inhibit at least one zone of said mechanism.

39. The system set forth in claims 26 or 27 further characterized by:
means for indicating an error condition when, after determining to depart the present zone, no next zone can be selected.

40. The apparatus of claim 39 further characterized by:
means having a table containing a list of zone names, input/output names, input/output images for each zone and allowed zones for each said zone,
a memory containing a plurality of error designations,
means for formulating an error message from said table and memory indicative of said error condition, and
means for generating the error message from the names of the last valid zone and the input/output names that caused the input/output image to not match the last valid zone or any of the allowed next zones.

* * * * *

UNITED STATES PATENT AND TRADEMARK OFFICE
CERTIFICATE OF CORRECTION

PATENT NO. : 5,157,595
DATED : October 20, 1992
INVENTOR(S) : Rodger T. Lovrenich It is certified that error appears in the above-indentified patent and that said Letters Patent is hereby corrected as shown below:

Col. 31, line 21: before "claim 8", insert "in".
Col. 11, line 25: change "FIG. 6" to -- FIG. 8 --.

Signed and Sealed this

Seventh Day of June, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,157,595
DATED : October 20, 1992
INVENTOR(S) : Rodger T. Lovrenich It is certified that error appears in the above-indentified patent and that said Letters Patent is hereby corrected as shown below:

Col. 3, line 21: change "mechanism." to -- mechanisms. --.
Col. 4, line 14: before "system", delete the word "the".
Col. 4, line 61: before "valid", delete the word "a".
Col. 5, line 63: change "work" to -- worm --.
Col. 6, line 35: change "other" to -- order --.
Col. 7, line 30: change "loops" to -- loop --.
Col. 7, line 49: change "mechanisms" to -- mechanism --.
Col. 8, line 10: change "in" to -- is --.

Col. 9, line 12: change "put" to -- input --.
Col. 9, line 62: change "AND" to -- and --.
Col. 10, line 13: change "IL" to -- 1L --.
Col. 11, line 8: chnage ", or" to -- or, --.

Col. 12, line 1: change "WHEN" to -- WHILE --.
Col. 12, line 5: change "associated" to -- associates --.
Col. 30, line 8: change "controlled" to -- comprised --.
Col. 30, line 14: change "means" to -- images --.
Col. 31, line 32: change "claim 6" to -- claim 8 --.

Signed and Sealed this

Fourth Day of October, 1994

Attest:

BRUCE LEHMAN

Attesting Officer

Commissioner of Patents and Trademarks